United States Patent
Mehta et al.

(10) Patent No.: US 12,019,523 B2
(45) Date of Patent: *Jun. 25, 2024

(54) SYSTEM AND METHOD FOR CLONING AS SQL SERVER AG DATABASES IN A HYPERCONVERGED SYSTEM

(71) Applicant: Nutanix, Inc., San Jose, CA (US)

(72) Inventors: Tarun Mehta, Bangalore (IN); Rohan Mohan Rayaraddi, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,427

(22) Filed: Feb. 27, 2023

(65) Prior Publication Data
US 2023/0251937 A1    Aug. 10, 2023

Related U.S. Application Data

(63) Continuation of application No. 17/122,740, filed on Dec. 15, 2020, now Pat. No. 11,604,705.
(Continued)

(51) Int. Cl.
*G06F 3/06* (2006.01)
*G06F 11/14* (2006.01)
*G06F 16/27* (2019.01)

(52) U.S. Cl.
CPC ........ *G06F 11/1464* (2013.01); *G06F 3/0608* (2013.01); *G06F 3/065* (2013.01);
(Continued)

(58) Field of Classification Search
CPC ............ G06F 11/1464; G06F 11/2094; G06F 16/273; G06F 16/275; G06F 16/27;
(Continued)

(56) References Cited

U.S. PATENT DOCUMENTS 625,315 A    5/1899   Bradford
749,117 A    1/1904   Wagner
(Continued)

FOREIGN PATENT DOCUMENTS

CN    104408071 A    3/2015
CN    105446828 A    3/2016
(Continued)

OTHER PUBLICATIONS

"Amazon RDS Now Supports Setting Up Connectivity Between Your RDS Database and EC2 Compute Instance in 1-Click", Amazon Web Services, https://aws.amazon.com/rds.
(Continued)

*Primary Examiner* — Khoa D Doan
(74) *Attorney, Agent, or Firm* — Foley & Lardner LLP

(57) ABSTRACT

A system and method include creating, by an Availability Group ("AG") controller in a virtual computing system, a first AG clone from a source database. The source database is stored on a primary replica node of an AG of the virtual computing system. The system and method also include creating, by the Controller, a second AG clone from the first AG clone and storing, by the Controller, the second AG clone on a secondary replica node of the AG. The second AG clone has a size of substantially zero.

30 Claims, 5 Drawing Sheets

Related U.S. Application Data

(60) Provisional application No. 63/065,925, filed on Aug. 14, 2020.

(52) U.S. Cl.
CPC ............ *G06F 3/067* (2013.01); *G06F 16/273* (2019.01); *G06F 16/275* (2019.01); *G06F 2201/80* (2013.01)

(58) Field of Classification Search
CPC ........ G06F 3/0608; G06F 3/065; G06F 3/067; G06F 2201/80; G06F 2209/455789; G06F 2209/45562; G06F 8/71; G06F 9/45558
See application file for complete search history.

(56) References Cited

U.S. PATENT DOCUMENTS

| | | | |
|---|---|---|---|
| 5,594,859 | A | 1/1997 | Palmer et al. |
| 6,064,975 | A | 5/2000 | Moon et al. |
| 6,243,715 | B1 | 6/2001 | Bogantz et al. |
| D508,248 | S | 8/2005 | Ording |
| D521,521 | S | 5/2006 | Jewitt et al. |
| 7,225,189 | B1 | 5/2007 | Mccormack et al. |
| 7,389,300 | B1 | 6/2008 | Shah et al. |
| 7,725,671 | B2 | 5/2010 | Prahlad et al. |
| D625,315 | S | 10/2010 | Jewitt et al. |
| 7,814,057 | B2 | 10/2010 | Kathuria et al. |
| 7,840,533 | B2 | 11/2010 | Prahlad et al. |
| 7,953,764 | B2 | 5/2011 | Baffier et al. |
| 8,117,165 | B1 | 2/2012 | Winckelmann et al. |
| D656,948 | S | 4/2012 | Kundsen et al. |
| 8,150,808 | B2 | 4/2012 | Zha et al. |
| 8,250,033 | B1 | 8/2012 | De Souter et al. |
| 8,291,409 | B2 | 10/2012 | Winner et al. |
| 8,364,648 | B1 | 1/2013 | Sim-Tang |
| 8,429,630 | B2 | 4/2013 | Nickolov et al. |
| 8,447,728 | B2 | 5/2013 | Prahlad et al. |
| 8,448,170 | B2 | 5/2013 | Wipfel et al. |
| D684,160 | S | 6/2013 | Truelove et al. |
| D684,161 | S | 6/2013 | Truelove et al. |
| 8,468,174 | B1 | 6/2013 | Yueh et al. |
| 8,549,518 | B1 | 10/2013 | Aron et al. |
| 8,601,473 | B1 | 12/2013 | Aron et al. |
| 8,612,396 | B1 | 12/2013 | Mcalister et al. |
| 8,635,421 | B2 | 1/2014 | Gupta et al. |
| 8,677,085 | B2 | 3/2014 | Vaghani et al. |
| 8,762,335 | B2 | 6/2014 | Prahlad et al. |
| 8,769,537 | B1 | 7/2014 | Ruggiero et al. |
| 8,832,028 | B2 | 9/2014 | Susairaj et al. |
| 8,849,850 | B2 | 9/2014 | Baffier et al. |
| 8,850,130 | B1 | 9/2014 | Aron et al. |
| 8,863,124 | B1 | 10/2014 | Aron |
| 8,874,749 | B1 | 10/2014 | Vittal et al. |
| 8,914,567 | B2 | 12/2014 | Miroshnichenko et al. |
| 8,924,974 | B1 | 12/2014 | Ruggiero et al. |
| 8,972,347 | B1 | 3/2015 | Sim-Tang |
| 9,009,106 | B1 | 4/2015 | Aron et al. |
| 9,069,708 | B2 | 6/2015 | Gill et al. |
| D733,745 | S | 7/2015 | Huang |
| 9,116,737 | B2 | 8/2015 | Aswathanarayana et al. |
| 9,213,727 | B1 | 12/2015 | Esposito |
| 9,244,717 | B2 | 1/2016 | Pissay et al. |
| D749,117 | S | 2/2016 | Huang |
| 9,256,383 | B2 | 2/2016 | De Spiegeleer et al. |
| 9,270,521 | B2 | 2/2016 | Tompkins |
| D753,135 | S | 4/2016 | Vazquez |
| D753,140 | S | 4/2016 | Kouvas et al. |
| 9,336,060 | B2 | 5/2016 | Nori et al. |
| 9,336,132 | B1 | 5/2016 | Aron et al. |
| 9,372,758 | B2 | 6/2016 | Ashutosh et al. |
| D761,288 | S | 7/2016 | Cianflone et al. |
| 9,384,254 | B2 | 7/2016 | Tekade et al. |
| 9,389,962 | B1 | 7/2016 | Yueh et al. |
| D763,890 | S | 8/2016 | Pan |
| 9,413,810 | B2 | 8/2016 | Rezvani et al. |
| 9,436,556 | B2 | 9/2016 | Siden et al. |
| D771,102 | S | 11/2016 | Protzman et al. |
| 9,495,435 | B2 | 11/2016 | Zhang et al. |
| 9,507,579 | B2 | 11/2016 | Gambardella et al. |
| 9,529,551 | B2 | 12/2016 | Kesavan et al. |
| D777,747 | S | 1/2017 | Derby et al. |
| D778,296 | S | 2/2017 | Belkin et al. |
| D779,514 | S | 2/2017 | Baris et al. |
| D781,887 | S | 3/2017 | Dziuba et al. |
| 9,600,193 | B2 | 3/2017 | Ahrens et al. |
| 9,639,429 | B2 | 5/2017 | Stewart et al. |
| 9,652,265 | B1 | 5/2017 | Narayanasamy et al. |
| 9,659,080 | B1 | 5/2017 | Drobychev et al. |
| 9,665,437 | B2 | 5/2017 | Bhargava et al. |
| D794,666 | S | 8/2017 | Havaldar et al. |
| D794,667 | S | 8/2017 | Havaldar et al. |
| 9,733,958 | B2 | 8/2017 | Cui et al. |
| 9,740,723 | B2 | 8/2017 | Prahlad et al. |
| 9,747,287 | B1 | 8/2017 | Bhardwaj et al. |
| D797,116 | S | 9/2017 | Chapman et al. |
| 9,753,713 | B2 | 9/2017 | Mani et al. |
| 9,760,396 | B2 | 9/2017 | Apte et al. |
| 9,772,866 | B1 | 9/2017 | Aron et al. |
| 9,778,992 | B1 | 10/2017 | Yueh et al. |
| D802,608 | S | 11/2017 | Hicks et al. |
| D803,231 | S | 11/2017 | Guinness et al. |
| D807,902 | S | 1/2018 | Cong et al. |
| 9,858,155 | B2 | 1/2018 | Ashutosh et al. |
| 9,881,168 | B2 | 1/2018 | Chari et al. |
| D809,530 | S | 2/2018 | Matheson et al. |
| D815,652 | S | 4/2018 | Protzman et al. |
| D817,976 | S | 5/2018 | Shilwant et al. |
| 9,960,963 | B2 | 5/2018 | Selvaraj et al. |
| 10,013,313 | B2 | 7/2018 | Zhang et al. |
| 10,033,833 | B2 | 7/2018 | Fu et al. |
| 10,055,300 | B2 | 8/2018 | Zhang et al. |
| 10,057,279 | B1 | 8/2018 | Balduzzi et al. |
| 10,108,685 | B2 | 10/2018 | Amdur et al. |
| 10,146,848 | B2 | 12/2018 | Narayanan et al. |
| D838,288 | S | 1/2019 | Sunshine et al. |
| 10,185,627 | B2 | 1/2019 | Wong et al. |
| D839,913 | S | 2/2019 | Chen et al. |
| 10,210,048 | B2 | 2/2019 | Sancheti |
| 10,212,195 | B2 | 2/2019 | Maskalik et al. |
| D843,388 | S | 3/2019 | Protzman et al. |
| 10,248,657 | B2 | 4/2019 | Prahlad et al. |
| 10,282,201 | B2 | 5/2019 | Tekade et al. |
| 10,339,110 | B2 | 7/2019 | Marinov et al. |
| 10,346,431 | B1 | 7/2019 | Broda et al. |
| 10,372,329 | B1 | 8/2019 | Ahrens et al. |
| 10,379,963 | B2 | 8/2019 | Bhargava et al. |
| D862,512 | S | 10/2019 | Schubart |
| 10,445,298 | B2 | 10/2019 | Ramu et al. |
| 10,447,806 | B1 | 10/2019 | Sahay et al. |
| 10,476,955 | B2 | 11/2019 | Mutalik et al. |
| D870,762 | S | 12/2019 | Mendoza Corominas et al. |
| 10,503,612 | B1 | 12/2019 | Wang et al. |
| 10,509,798 | B2 | 12/2019 | Chow et al. |
| D875,108 | S | 2/2020 | Chitalia et al. |
| D877,753 | S | 3/2020 | Chitalia et al. |
| 10,599,423 | B2 | 3/2020 | Coleman et al. |
| 10,606,578 | B2 | 3/2020 | Kruglikov et al. |
| 10,613,938 | B2 | 4/2020 | Blumenau et al. |
| 10,637,914 | B2 | 4/2020 | Basavaiah et al. |
| 10,700,991 | B2 | 6/2020 | Khinvasara et al. |
| 10,719,407 | B1 | 7/2020 | Chockalingam et al. |
| 10,725,866 | B1 | 7/2020 | Palaiah et al. |
| 10,728,255 | B2 | 7/2020 | Jindal et al. |
| 10,757,036 | B2 | 8/2020 | Tung et al. |
| 10,776,329 | B2 | 9/2020 | Ramohalli Gopala Rao et al. |
| 10,778,750 | B2 | 9/2020 | Ringdahl |
| 10,785,029 | B2 | 9/2020 | Gupta et al. |
| 10,812,582 | B2 | 10/2020 | Spillane et al. |
| 10,817,157 | B2 | 10/2020 | Kuchibhotla et al. |
| 10,824,956 | B1 | 11/2020 | Natanzon et al. |
| D911,356 | S | 2/2021 | Varghese et al. |
| 10,938,924 | B1 | 3/2021 | Jensen et al. |
| 10,951,496 | B2 | 3/2021 | Baker et al. |

(56) References Cited

U.S. PATENT DOCUMENTS

| | | |
|---|---|---|
| 10,959,098 B2 | 3/2021 | Cidon et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| D926,200 S | 7/2021 | Murphy et al. |
| D927,507 S | 8/2021 | Norman |
| 11,108,629 B1 | 8/2021 | Cahyadi et al. |
| 11,126,426 B2 | 9/2021 | Zhu et al. |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 | 3/2022 | Javadekar |
| 11,308,114 B1 | 4/2022 | Moghe |
| 11,372,820 B1 | 6/2022 | Harjono et al. |
| 11,386,058 B2 | 7/2022 | Hung et al. |
| 2001/0014867 A1 | 8/2001 | Conmy |
| 2002/0073089 A1 | 6/2002 | Schwartz et al. |
| 2002/0104376 A1 | 8/2002 | Danyluk et al. |
| 2002/0174098 A1 | 11/2002 | Wu et al. |
| 2003/0147309 A1 | 8/2003 | Weisberg |
| 2005/0149757 A1 | 7/2005 | Corbett et al. |
| 2006/0143412 A1 | 6/2006 | Armangau |
| 2006/0161444 A1 | 7/2006 | Lubrecht et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0126945 A1 | 5/2008 | Munkvold et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0228669 A1 | 9/2009 | Slesarev et al. |
| 2010/0023564 A1 | 1/2010 | Yerneni et al. |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0252420 A1 | 10/2011 | Tung et al. |
| 2012/0011378 A1 | 1/2012 | Dalton et al. |
| 2012/0123999 A1 | 5/2012 | Ashutosh et al. |
| 2012/0271797 A1 | 10/2012 | Patil |
| 2012/0290714 A1 | 11/2012 | Cohen |
| 2013/0091285 A1 | 4/2013 | Devarakonda et al. |
| 2013/0117441 A1 | 5/2013 | Kuchibhotla et al. |
| 2013/0263119 A1 | 10/2013 | Pissay et al. |
| 2013/0290180 A1 | 10/2013 | Baffier et al. |
| 2014/0006350 A1 | 1/2014 | Fukui et al. |
| 2014/0059226 A1 | 2/2014 | Messerli et al. |
| 2014/0101117 A1 | 4/2014 | Uzzaman |
| 2014/0189685 A1 | 7/2014 | Kripalani |
| 2014/0201171 A1 | 7/2014 | Vijayan et al. |
| 2014/0229698 A1 | 8/2014 | Sivasubramanian et al. |
| 2014/0282256 A1 | 9/2014 | Fish et al. |
| 2014/0359058 A1 | 12/2014 | Karnawat et al. |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0142610 A1 | 5/2015 | Manoharan et al. |
| 2015/0143064 A1 | 5/2015 | Bhargava et al. |
| 2015/0195347 A1 | 7/2015 | Luft |
| 2015/0227435 A1 | 8/2015 | Ashutosh et al. |
| 2015/0227602 A1 | 8/2015 | Ramu et al. |
| 2015/0301814 A1 | 10/2015 | Chen et al. |
| 2015/0331923 A1 | 11/2015 | Kim |
| 2015/0347987 A1 | 12/2015 | Ali |
| 2015/0358417 A1 | 12/2015 | Patil et al. |
| 2015/0370641 A1* | 12/2015 | Susairaj ................ G06F 16/27 707/645 |
| 2016/0041997 A1 | 2/2016 | Gokhale et al. |
| 2016/0048408 A1 | 2/2016 | Madhu et al. |
| 2016/0077923 A1 | 3/2016 | Zhang et al. |
| 2016/0078104 A1 | 3/2016 | Clifford et al. |
| 2016/0092535 A1 | 3/2016 | Kuchibhotla et al. |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0197835 A1 | 7/2016 | Luft |
| 2016/0224259 A1 | 8/2016 | Ahrens et al. |
| 2016/0267105 A1 | 9/2016 | Sun et al. |
| 2016/0274981 A1 | 9/2016 | Wilkinson |
| 2016/0292358 A1 | 10/2016 | Heger |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0380809 A1 | 12/2016 | Hou et al. |
| 2017/0060699 A1 | 3/2017 | Hohl et al. |
| 2017/0115978 A1 | 4/2017 | Modi et al. |
| 2017/0220777 A1 | 8/2017 | Wang et al. |
| 2017/0235758 A1 | 8/2017 | Gopalapura Venkatesh et al. |
| 2017/0235950 A1 | 8/2017 | Gopalapura Venkatesh et al. |
| 2017/0264684 A1 | 9/2017 | Spillane et al. |
| 2017/0286517 A1 | 10/2017 | Horowitz et al. |
| 2017/0286518 A1 | 10/2017 | Horowitz et al. |
| 2017/0351584 A1 | 12/2017 | Griffith et al. |
| 2017/0351716 A1 | 12/2017 | Higginson et al. |
| 2017/0374136 A1 | 12/2017 | Ringdahl |
| 2018/0025007 A1 | 1/2018 | Dai |
| 2018/0121494 A1 | 5/2018 | Antonopoulos et al. |
| 2018/0157561 A1 | 6/2018 | Venkatesh et al. |
| 2018/0181469 A1 | 6/2018 | Yueh et al. |
| 2018/0253676 A1 | 9/2018 | Sheth et al. |
| 2018/0275881 A1 | 9/2018 | Ashraf et al. |
| 2018/0285201 A1 | 10/2018 | Bangalore et al. |
| 2018/0307728 A1 | 10/2018 | Crupi et al. |
| 2019/0005407 A1 | 1/2019 | Harris et al. |
| 2019/0018738 A1 | 1/2019 | Chen |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0230156 A1 | 7/2019 | Mclarty et al. |
| 2019/0235904 A1 | 8/2019 | Epping et al. |
| 2019/0266268 A1 | 8/2019 | Polinati |
| 2019/0310926 A1 | 10/2019 | Hashimoto et al. |
| 2019/0324865 A1 | 10/2019 | Weissman et al. |
| 2019/0332582 A1 | 10/2019 | Kumar et al. |
| 2019/0339870 A1 | 11/2019 | Meiri et al. |
| 2019/0340091 A1 | 11/2019 | Chandrasekaran et al. |
| 2019/0362004 A1 | 11/2019 | Oks et al. |
| 2019/0384496 A1 | 12/2019 | Abdul Rasheed et al. |
| 2019/0391880 A1 | 12/2019 | Wang et al. |
| 2019/0394093 A1 | 12/2019 | Kulkarni et al. |
| 2020/0034178 A1 | 1/2020 | Gupta et al. |
| 2020/0034245 A1 | 1/2020 | Kohler |
| 2020/0050522 A1 | 2/2020 | Coleman et al. |
| 2020/0097177 A1 | 3/2020 | Ashokkumar et al. |
| 2020/0099692 A1 | 3/2020 | Jindal et al. |
| 2020/0104375 A1 | 4/2020 | Earnesty et al. |
| 2020/0104376 A1 | 4/2020 | Earnesty et al. |
| 2020/0104377 A1 | 4/2020 | Earnesty et al. |
| 2020/0106737 A1 | 4/2020 | Beedu et al. |
| 2020/0110675 A1 | 4/2020 | Wang et al. |
| 2020/0137157 A1 | 4/2020 | Joseph et al. |
| 2020/0193388 A1 | 6/2020 | Tran-Kiem et al. |
| 2020/0201526 A1 | 6/2020 | Kuchibhotla et al. |

(56) References Cited

U.S. PATENT DOCUMENTS

| | | |
|---|---|---|
| 2020/0210378 A1 | 7/2020 | Kuchibhotla et al. |
| 2020/0210379 A1 | 7/2020 | Kuchibhotla et al. |
| 2020/0250046 A1 | 8/2020 | Wong et al. |
| 2020/0250059 A1 | 8/2020 | Bothello et al. |
| 2020/0285608 A1 | 9/2020 | Chakankar et al. |
| 2020/0285652 A1 | 9/2020 | Wang et al. |
| 2020/0349018 A1 | 11/2020 | Meadowcroft et al. |
| 2020/0379793 A1 | 12/2020 | Parihar et al. |
| 2021/0064512 A1 | 3/2021 | Sirov et al. |
| 2021/0117293 A1 | 4/2021 | Luo et al. |
| 2021/0133031 A1 | 5/2021 | Moldvai et al. |
| 2021/0144060 A1 | 5/2021 | Cencini et al. |
| 2021/0200643 A1 | 7/2021 | Luo et al. |
| 2021/0406717 A1 | 12/2021 | Tauheed et al. |
| 2023/0095814 A1 | 3/2023 | Sarkar |
| 2023/0096071 A1 | 3/2023 | Sarkar |
| 2023/0185823 A1 | 6/2023 | Chu et al. |
| 2023/0195529 A1 | 6/2023 | Luthra et al. |

FOREIGN PATENT DOCUMENTS

| | | |
|---|---|---|
| CN | 108664660 A | 10/2018 |
| CN | 113010599 A | 6/2021 |
| EP | 1 654 683 B1 | 5/2006 |
| LU | 102236 B1 | 11/2020 |
| TW | 201600970 A1 | 1/2016 |
| WO | WO-2016/069029 A1 | 5/2016 |
| WO | WO-2020/072338 A1 | 4/2020 |
| WO | WO-2021/108075 A1 | 6/2021 |

OTHER PUBLICATIONS

"Azure Arc extends the Azure control plane", https://infohub.delltechnologies.com/l/techbook-dell-emc-integrated-system-for-microsoft-azure-stack-hci-2/azure-arc-extends-the-azure-control-plane-14.

"Configure cross-tenant access settings for B2B collaboration", Azure AD, Microsoft Entra, May 24, 2022, 21pp.

"Connected Machine Agent Prerequisites", Sep. 27, 2022, https://learn.microsoft.com/en-us/azure/azure-arc/servers/prerequisites.

"Control Plane", https://docs.controlplane.com.

"Exadata Database Service onCloud@Customer Administrator'sGuide", https://docs.oracle.com/en/engineered-systems/exadata-cloud-at-customer/ecccm/ecc-network-requirements.html#GUID-F06BD75B-E971-48ED-8699-E1004D4B4AC1.

Features and Capabilities of Azure Arcenabled SQL Managed Instance:, Aug. 13, 2022, https://learn.microsoft.com/en-us/azure/azure-arc/data/managed-instance-features.

"Managing Cloud-Native Workloads with Anthos", https://authors.packtpub.com/wp-content/uploads/2021/10/Chapter-8-Professional-Cloud-Architect-1.pdf.

"Oracle Exadata Cloud@Customer X9M", Version 1.17, 2022, https://www.oracle.com/dk/a/ocom/docs/engineered-systems/exadata/exacc-x9m-ds.pdf.

"Overview of Azure Connected Machine Agent", Sep. 4, 2022, https://learn.microsoft.com/en-us/azure/azure-arc/servers/agent-overview.

"Row-Level Security", Sep. 17, 2022, https://learn.microsoft.com/en-us/sql/relational-databases/security/row-level-security?view=sql-server-ver16.

"Use Azure Private Link to Securely Connect Servers to Azure Arc", Jul. 28, 2022, https://learn.microsoft.com/en-us/azure/azure-arc/servers/private-link-security.

Alhamazani, et al, "Cross-Layer Multi-Cloud Real-Time Application QoS Monitoring and Benchmarking As-a-Service Framework", https://arxiv.org/ftp/arxiv/papers/1502/1502.00206.pdf.

Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).

Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.

Amazon Web Services, "Amazon RDS on Outposts", https://aws.amazon.com/rds/outposts/?pg=In&sec=hiw.

Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.

Amazon Web Services, "SaaS Tenant Isolation Strategies. Isolating Resources in a Multi-Tenant Environment", (Aug. 2020).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

Anthos Technical Overview, https://cloud.google.com/anthos/docs/concepts/overview.

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.

AWS Prescriptive Guidance, "PostgreSQL Pool Model", https://docs.aws.amazon.com/prescriptive-guidance/latest/saas-multitenant-managed-postgresql/pool.html.

AWS Prescriptive Guidance, "Row-Level Security Recommendations", https://docs.aws.amazon.com/prescriptive-guidance/latest/saas-multitenant-managed-postgresql/rls.html.

AWS Serverless SaaS Workshop—Lab4 : Isolating tenant data in a pooled model—Adding the missing code.

AWS Serverless SaaS Workshop—Lab4 : Isolating tenant data in a pooled model—Revisiting Authentication, Authorization, & Tenant Isolation.

AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).

Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).

BackupAssist, "https://backupassist.com/support/en/backupassist/manage/calendar.htm", Jul. 1, 2017 (Year: 2017).

Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

(56) References Cited

OTHER PUBLICATIONS

Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Bucur, et al., "Multi-Cloud Resource Management Techniques for Cyber-Physical Systems", MDPI, Dec. 15, 2021, https://www.ncbi.nlm.nih.gov/pmc/articles/PMC8706026/.

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Cunnhingham, "Introducing PlanetScale Managed Cloud", Nov. 3, 2021, https://planetscale.com/blog/introducing-planetscale-managed-cloud.

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.

Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.

Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.

Delphix Corp., "FAQ: SnapShot and SnapSync (KBA1014)," Delphix, published March, 4 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).

Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.

Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.

Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.

Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Delphix, "Understanding SnapSync and LogSync for Oracle" (May 5, 2013) from https://www.delphix.com/blog/data-virtualization/understanding-snapsync-and-logsync-oracle (accessed Jan. 7, 2020).

Drake, Sam et al. "Architecture of Highly Available Databases" International Service Availability Symposium, pp. 1-16. Springer, Berlin, Heidelberg, 2004. (Year: 2004).

Dremio, "Multiple AWS Clusters" Dremio. 2020. Received from https://docs.dremio.com/deployment/provisioning-ec2.html (Year: 2020).

Ex Parte Quayle Action with Refs. on U.S. Appl. No. 29/733,571 DTD Feb. 11, 2022.

Extended European Search Report re EP21192308.1 DTD Jan. 24, 2022.

Extended European Search Report re EP21192379.2 DTD Jan. 26, 2022.

Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Final Office Action on U.S. Appl. No. 16/234,547 DTD Sep. 9, 2022.

Final Office Action on U.S. Appl. No. 16/234,547 DTD Oct. 5, 2021.

Final Office Action on U.S. Appl. No. 17/006,595 DTD Oct. 14, 2021.

Final Office Action on U.S. Appl. No. 17/182,511 DTD Dec. 6, 2022.

Final Office Action on U.S. Appl. No. 17/337,197 DTD Dec. 15, 2022.

Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).

Foreign Action other than Search Report on EP 21192308.1 DTD Apr. 6, 2022.

Foreign Action other than Search Report on EP 21192308.1 DTD Jun. 10, 2022.

Foreign Action other than Search Report on EP 21192379.2 DTD Jun. 15, 2022.

Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017/07/designing-perfect-date-time-picker/> (Year: 2017).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Geek University, "VM snapshot files," VMware ESXi course, retrieved Sep. 11, 2022 from https://geek-university.com/vm-snapshot-files/.

Geier, Eric, "Using Static IP Addresses on Your Network" Cisco Press. Sep. 14, 2009. Received from https://www.ciscopress.com/articles/article.asp?p=1393495. (Year: 2009).

Google Cloud, "Architectures for high availability of PostgreSQL clusters on Compute Engine" Google Cloud Architecture Center,

(56) References Cited

OTHER PUBLICATIONS (Jan. 21, 2021) from https://cloud.google.com/architecture/architectures-high-availability-postgresql-clusters-compute-engine (accessed Dec. 14, 2021).
Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).
Guevara, Introducing PlanetScale Insights: Advanced query monitoring, May 26, 2022, https://planetscale.com/blog/introducing-planetscale-insights-advanced-query-monitoring.
Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).
Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).
Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).
Hosterman, Cody, "Introducing vSphere Virtual Volumes on the FlashArray" PureStorage, (Jun. 13, 2017) from https://blog.purestorage.com/purely-technical/introducing-vsphere-virtual-volumes-on-the-flasharray/ (accessed Jun. 28, 2021).
Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).
Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).
Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).
IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).
Katz, Jonathan S. "Multi-Kubernetes Cluster PostgreSQL Deployments" Crunchy Data. May, 7, 2020. Received from https://info.crunchydata.com/blog/multi-kubernetes-cluster-postgresql-deployments (Year: 2020).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).
Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).
Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).
Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).
Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).
Lctree, "Lctree," Linked Clone Tree Visualizer for vCloud Director, published (Nov. 28, 2012).
Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).
M. A. Metawai et al. "Load balancing in distributed multi-agent computing systems" Ain Shams Engineering Journal. ASEJ. May 23, 2012. p. 237-249. (Year: 2012).
Matijaca, Ante, "Dashboard" Dribble, published Dec. 21, 2015, retrieved Feb. 11, 2022 from <https://dribbble.com/shots/2417233-Dashboard> (Year: 2015).
Meadowcroft, Ben, "Virtual Volumes First Year In Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).
Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).
Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).
Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).
Microsoft Docs, "Always On availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.
Microsoft Docs, "What is an Always On availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.
Microsoft SQL, "Upgrading Always On Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).
Mulford, Juan, "vSphere 7—Describe Instant Clone Architecture And Use Cases," Mulcas Cloudy Infrastructures, published Dec. 28, 2021, retrieved Sep. 11, 2022 from https://mulcas.com/vsphere-7-describe-instant-clone-architecture-and-use-cases/.
Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.
MVware, "Horizon Architecture", https://techzone.vmware.com/resource/horizon-architecture#introduction.
Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).
Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).
Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).
Nizhegolenko, Alexey. "High-Availability MySQL cluster with load balancing using HAProxy and Heartbeat." Towards Data Science. Dec. 3, 2018. Retrieved from https://towardsdatascience.com/high-

(56) References Cited

OTHER PUBLICATIONS availability-mysql-cluster-with-load-balancing-using-haproxy-and-heartbeat-40a16e134691 (Year: 2018).
Non-Final Office Action on U.S. Appl. No. 16/228,728 DTD Mar. 24, 2020.
Non-Final Office Action on U.S. Appl. No. 16/234,547 DTD Feb. 22, 2022.
Non-Final Office Action on U.S. Appl. No. 16/234,547 DTD Apr. 15, 2021.
Non-Final Office Action on U.S. Appl. No. 16/234,547 DTD Nov. 7, 2022.
Non-Final Office Action on U.S. Appl. No. 16/234,553 DTD Jan. 6, 2021.
Non-Final Office Action on U.S. Appl. No. 17/122,740 DTD Aug. 19, 2022.
Non-Final Office Action on U.S. Appl. No. 17/181,586 DTD Jul. 1, 2022.
Non-Final Office Action on U.S. Appl. No. 17/182,511 DTD Jul. 21, 2022.
Non-Final Office Action on U.S. Appl. No. 17/237,599 DTD Oct. 14, 2022.
Non-Final Office Action on U.S. Appl. No. 17/337,197 DTD Sep. 8, 2022.
Notion, "Database templates," Notion Help Center, retrieved Sep. 29, 2022 from https://www.notion.so/help/database-templates.
Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.
Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.
Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJWOZPW22N (Year: 2020).
Nyffenegger et al., "SQL Server Instance" 2017, from https://renenyffenegger.ch/notes/development/databases/SQL-Server/architecture/instance (retrieved Jan. 25, 2022).
Opster, "High Availability in Elasticsearch—Cross Cluster Replication and Alternatives" Opster. 2020. Received from https://opster.com/blogs/elasticsearch-cross-cluster-replication-overview/ (Year: 2020).
Opster, "Multi-Cluster Load Balancer—An Alternative to Cross Cluster Replication" Opster. 2020. Received from https://opster.com/elasticsearch-multi-cluster-load-balancer/ (Year: 2020).
Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).
Oracle Cloud, "Using Oracle Autonomous Database on Shared Exadata Infrastructure" published Dec. 2022.
Oracle Communications, "Provisioning Database Interface User's Guide, Release 16.0" (Sep. 2014) Oracle, p. 1-174.
Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).
Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.
Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Oracle Exadata Cloud@Customer X9M", Version 1.17, 2022, https://www.oracle.com/dk/a/ocom/docs/engineered-systems/exadata/exacc-x9m-ds.pdf.
Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).
Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).
Patil, Manoj E. et al. "Design and Implementation of Graphical User Interface for Relational Database Management System" (2012), International Jounral of Computer Science and Information Technologies (IJCSIT), vol. 3 (3), p. 3871-3874.
PlanetScale, Deployment Options Documentation, Aug. 1, 2022, https://planetscale.com/docs/concepts/deployment-options#cloud.
PlanetScale, Query Insights Documentation, 2022, https://planetscale.com/docs/concepts/query-insights#insights-page-overview.
PlanetScale, The MySQL-compatible serverless database platform, 2022, https://planetscale.com.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Principled Technologies, "VMware vCloud Automation Center DBaaS: Provision databases in minutes" A Principled Technologies Test

(56) References Cited

OTHER PUBLICATIONS

Report (Aug. 2014) from https://www.principledtechnologies.com/vmware/vCAC_DBaaS_0914.pdf (accessed Jun. 2, 2021).
Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.
Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).
Reed, Kate "Nutanix Introduces Database Services with Era" (published May 9, 2018) Business Wire, from https://www.businesswire.com/news/home/20180509005397/en/ (accessed Dec. 18, 2019).
Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).
Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).
Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.
Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.
Sanglaji, Maryam et al. "Nutanix Era: Databases Made Simple" (published 2018) Nutanix, from https://www.nutanix.com/blog/nutanix-era-databases-made-simple (accessed Dec. 18, 2019).
Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).
Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).
Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.
Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).
Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).
Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).
Stone, "Cross Tenant Access", LoanPro Help, https://help.loanpro.io/article/vyy37c5bhd-cross-tenant-access, accessed Jun. 29, 2022.
Storti, Brian "A Primer on Database Replication" Brianstorti.com (May 23, 2017) from https://www.brianstorti.com/replication/ (accessed Jun. 28, 2021).
Tang, "Multi-tenant access control for cloud services", Aug. 2014, The University of Texas at San Antonio College of Sciences.
Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).
Tessel for Oracle, "Fully-managed, high-performance Oracle databases with enterprise-grade data protection, security, and compliance@ your terms", 2022, https://www.tessell.io/services/oracle.
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
US Office Action on U.S. Appl. No. 17/006,595 DTD Aug. 27, 2021.
Virtualization Works, "VMware vFabric Data Director" Virtualization Works: VMware Authorized Online Reseller, (Jun. 2021) from https://www.virtualizationworks.com/vFabric-Data-Director.asp#:~:text=VMware%C2%AE%20vFabric%E2%84%A2%20Data,agility%20and%20reducing%20database%20TCO (accessed Jun. 28, 2021).
VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).
VMware Horizon, "Horizon Control Plane Services Architecture", Sep. 2021, https://images.techzone.vmware.com/sites/default/files/resource/horizon_control_plane_services_architecture_noindex.pdf.
VMware Tanzu, "Innovate and grow your business on any and many clouds-fast", 2022.
VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.
VMware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-AB0D3642B788.html.
VMware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.
VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.
VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.
VMware, "Horizon Cloud on Microsoft Azure Architcture", https://techzone.vmware.com/resource/horizon-cloud-on-microsoft-azure-architecture#introduction.
VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.

(56) References Cited

OTHER PUBLICATIONS

VMware, "Horizon Control Plane Services Architecture", Sep. 2021, https://images.techzone.vmware.com/sites/default/files/resource/horizon_control_plane_services_architecture_noindex.pdf.
VMware, "Horizon Messaging", https://docs.vmware.com/en/VMware-Horizon-7/7.13/horizon-architecture-planning/GUID-39B5D03B-F619-4355-A30A-F8544D95539C.html.
VMware, "Learn More About Network Profiles in vRealize Automation Cloud", https://docs.vmware.com/en/vRealize-Automation/services/Using-and-Managing-Cloud-Assembly/GUID-01E442EE-4004-4ED1-AA32-9CF73F24CB09.html.
VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.
VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.
VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.
VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.
VMWare, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.
VMware, "VMware Horizon 7 Instant-Clone Desktops And RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.
VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.
VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.
VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.
VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.
VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).
VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).
VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).
VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).
VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
VMware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).
VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).
VMware, Cloud Control Plane Management, "Horizon Control Plane Services", https://www.vmware.com/in/products/horizon/controlplane.html.
VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.
Warner, Alex et al., "Chapter 16—Canarying Releases" (published 2018) Google Workbook published by O'Reilly Media, Inc., from https://sre.google/workbook/canarying-releases/ (accessed Sep. 14, 2021).
Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).
WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).
Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).
YouTube Video for Delphix Corp., "How To Create Database Copies with Delphix," YouTube, Apr. 3, 2018, https://www.youtube.com/watch?v=1EjR-k4EJ68 [youtube.com].
YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].
YouTube Video screenshots for "Nutanix Business Critical Applications & Databases—.NEXT Europe 2019," YouTube, Oct. 16, 2019, https://www.youtube.com/watch?v=KI7lEmm6j60 [youtube.com].
YouTube Video screenshots for "Nutanix Era .NEXT 2019 Demo," YouTube, May 10, 2019, https://www.youtube.com/watch?v=PAWHHdCEArc&t=267s [youtube.com].
YouTube Video screenshots for Nutanix, "Nutanix Era .NEXT 2019 Demo", YouTube, May 10, 2019, https://youtu.be/PAWHHdCEArc [youtube.com].
YouTube Video screenshots for Nutanix, "Unify Private and Public Clouds with Nutanix Clusters", YouTube, Jul. 31, 2020, https://www.youtube.com/watch?v=xuw4F4wBDoc [youtube.com].
Zhang, Junchi, "vFabric Data Director 2.7 customer deck," published May 17, 2013, retrieved Sep. 11, 2022 from https://www.slideshare.net/harryaya/vfabric-data-director-27-customer-deck.
Actifio Enablement Team, "https:/Awww.youtube.com/watch?v=7mCcJTXxFM3l", "Oracle Advanced Data Protection and Workflows", May 15, 2018 ) (Year: 2018).

(56) References Cited

OTHER PUBLICATIONS

AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).
AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).
AWS. "AWS glossary" AWS General Reference Guide. Jan. 2013. Retrieved from https://docs.aws.amazon.com/general/latest/gr/glos-chap.html (accessed Apr. 6, 2023).
AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).
AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).
AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).
AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).
AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).
AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Jun. 2018. Retrieved from https://aws.amazon.com/kubernetes/# :~: text=Kubernetes%20manages%20clusters%20of%20Amazon,premises%20and%20in%20the%20cloud (accessed Apr. 6, 2023).
AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).
AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).
AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Nov. 30, 2020. Retrieved from https://docs.aws.amazon.com/AmazonRDS/latest/UserGuide/SQLServer.ReadReplicas.html (accessed Apr. 25, 2023).
Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
DbInsight. "Turn your Database into a Service " A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).
Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).
Final Office Action on U.S. Appl. No. 16/234,547 DTD May 11, 2023.
Final Office Action on U.S. Appl. No. 16/805,581 DTD Jul. 6, 2022.
Flexera. "How can I copy an EBS snapshot between different EC2 regions?" Flexera CMP Docs. Dec. 19, 2015. Retrieved from https://docs.rightscale.com/faq/clouds/aws/How_can_I_copy_an_EBS_snapshot_between_different_EC2_regions.html (accessed Apr. 6, 2023).
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).
Jain, Viral. "How To Create SQL Database In AWS" C-Sharp Corner. May 4, 2018. Retrieved from https://www.c-sharpcorner.com/article/how-to-create-sql-database-in-aws/ (accessed Jul. 26, 2023).
Non-Final Office Action on U.S. Appl. No. 16/805,581 DTD Jan. 14, 2022.
Non-Final Office Action on U.S. Appl. No. 16/805,581 DTD Oct. 12, 2022.
Non-Final Office Action on U.S. Appl. No. 17/337,197 DTD Jun. 6, 2023.
Nutanix Inc., "Prism 5.5, Prism Central Guide" (Jul. 7, 2020) pp. 1-618.
Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.
PlanetScale. "PlanetScale is the world's most advanced serverless MySQL platform" PlanetScale. Retrieved from https://planetscale.com/ (accessed Apr. 6, 2023).
Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).
Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).
Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).
YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].
YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGoIVFBuU [youtube.com].
YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].
YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].

(56) References Cited

OTHER PUBLICATIONS

YouTube Video screenshots for Nutanix University. "How To Provision a PostgreSQL cluster using Nutanix Era | Nutanix University" YouTube. Aug. 8, 2019. https://youtube.com/watch?v=FoDGtORWNnU [youtube.com].
AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).
AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).
AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).
AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).
Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).
Google Cloud. "Rest Resource: subnetworks" Compute Engine. Jul. 1, 2019. Retrieved from https://cloud.google.com/compute/docs/reference/rest/beta/subnetworks (accessed Sep. 6, 2023).
MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).
Tudip Digital. "What is Deployment Manager?" Tudip. Jun. 24, 2019. Retrieved from https://tudip.com/blog-post/what-is-deployment-manager/ (accessed Sep. 6, 2023).
AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).
AWS. "Amazon EC2 M5 Instances" Amazon DocumentDB. Amazon EC2. Retrieved from https://aws.amazon.com/ec2/instance-types/m5/ (accessed Apr. 6, 2023).
AWS. "Amazon ECS clusters" Amazon Elastic Container Service. Retrieved from https://docs.aws.amazon.com/AmazonECS/latest/developerguide/clusters.html (accessed Apr. 6, 2023).
AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).
AWS. "AWS glossary" AWS General Reference Guide. Retrieved from https://docs.aws.amazon.com/general/latest/gr/glos-chap.html (accessed Apr. 6, 2023).
AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).
AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).
AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Retrieved from https://aws.amazon.com/kubernetes/# :~: text=Kubernetes%20manages%20clusters%20of%20Amazon,premises%20and%20in%20the%20cloud (accessed Apr. 6, 2023).
AWS. "Storage" Amazon Elastic Compute Cloud. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).
AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).
AWS. "What Is An Instance In Cloud Computing?" Amazon Web Services. Retrieved from https://aws.amazon.com/what-is/cloud-instances/# :~: text=You%20can%20run%20multiple%20virtual,of%20sharing%20and%20scaling%20resources (accessed Apr. 6, 2023).
AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).
Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_EC2_regions.html (accessed Apr. 6, 2023).
Microsoft. "Basic Always On availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).
Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).
Notice of Allowance on U.S. Appl. No. 16/805,581 DTD Apr. 3, 2023.
Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).
Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).
Tessell. "Differentiated Infrastructure. Delightful Management." Tessell. Retrieved from https://query.prod.cms.rt.microsoft.com/cms/api/am/binary/RW13XNT (accessed Apr. 6, 2023).
Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).
Tessell. "The Tessell platform provides unparalleled security for your data and users" Tessell. Retrieved from https://query.prod.cms.rt.microsoft.com/cms/api/am/binary/RW13XNU (accessed Apr. 6, 2023).
Bhrara, Raminder. "Oracle Cloud Infrastructure OCI Gen-2 Cloud Security—Part II (Identity and Access Management)" RedThunder.Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).
Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).
Non-Final Office Action on U.S. Appl. No. 17/951,632 DTD Sep. 14, 2023.

(56) References Cited

OTHER PUBLICATIONS

Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).
AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).
AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).
AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).
AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).
CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).
Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).
Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 23).
Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).
Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).
Matijaca, Ante, "Dashboard" Dribbble, published Dec. 21, 2015, retrieved Feb. 11, 2022 from <https://dribbble.com/shots/2417233-Dashboard> (Year: 2015).
MongoDB. "mongo Shell Methods" Reference. Aug. 2019. Retrieved from https://www.mongodb.com/docs/v4.2/reference/method/ (accessed Aug. 30, 2023).
MongoDB. "mongodb" GitHub. Mar. 2015. Retrieved from https://github.com/mongodb/docs/blob/v4.2/source/core/replica-set-priority-0-member.txt (accessed Aug. 30, 2023).
MongoDB. "Priority 0 Replica Set Members" MongoDB Manual. Aug. 2019. Retrieved from https://www.mongodb.com/docs/manual/core/replica-set-priority-0-member/ (accessed Aug. 30, 2023).
MongoDB. "Replica Set Elections" MongoDB Manual. Aug. 2019. Retrieved from https://www.mongodb.com/docs/manual/core/replica-set-elections/ (accessed Aug. 30, 2023).
MongoDB. "Replica Set Members" Replication. Aug. 2019. Retrieved from https://www.mongodb.com/docs/v4.2/core/replica-set-members/#replica-set-secondary-members (accessed Aug. 30, 2023).
MongoDB. "The mongo Shell" MongoDB. Aug. 2019. Retrieved from https://www.mongodb.com/docs/v4.2/mongo/ (accessed Aug. 30, 2023).
MongoDB. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).
MongoDB. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).
Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).
Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).
Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).
Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 2023).
Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).
Quest. "Creating custom User-defined Database Groups" Support. Aug. 16, 2017. Retrieved from https://support.quest.com/kb/4229519/creating-custom-user-defined-database-groups (accessed Aug. 30, 2023).
Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).
Shah, Manish. "Gen 2 Exadata Cloud at Customer New Features: Shared ORACLE_HOME" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).
Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 2023).
YouTube Video screenshots for "Nutanix Business Critical Applications & Databases—.NEXT Europe 2019," YouTube, Oct. 16, 2019, https://www.youtube.com/watch?v=KI7IEmm6j60 [youtube.com].
YouTube Video screenshots for "Nutanix Era .NEXT 2019 Demo," YouTube, May 10, 2019, https://www.youtube.com/watch?v=8hbpfrOSw0U [youtube.com].
YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGolVFBuU [youtube.com].
Foreign Search Report on PCT DTD Sep. 7, 2023.
Github. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).
Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).
Kubernetes. "Authenticating" Kubernetes Documentation. Jul. 12, 2018. Retrieved from https://kubernetes.io/docs/reference/access-authn-authz/authentication/ (accessed Oct. 11, 2023).
Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).
Kubernetes. "Nodes" Kubernetes Documentation. Jul. 14, 2017. Retrieved from https://kubernetes.io/docs/concepts/architecture/nodes/ (accessed Oct. 11, 2023).

(56) References Cited

OTHER PUBLICATIONS

Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).

Kubernetes. "PKI certificates and requirements" Kubernetes Documentation. Jun. 16, 2019. Retrieved from https://kubernetes.io/docs/setup/best-practices/certificates/ (accessed Oct. 11, 2023).

Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).

Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).

Progress. "Simple tenancy" Progress Documentation. Apr. 12, 2017. Retrieved from https://docs.progress.com/bundle/openedge-database-management-117/page/Simple-tenancy.html (accessed Sep. 28, 2023).

Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).

Progress. "Tenant-ID() method" Progress Documentation. Jun. 2011. Retrieved from https://docs.progress.com/bundle/abl-reference/page/TENANT-ID-method.html# (accessed Sep. 28, 2023).

Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).

Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).

Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).

YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).

YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).

YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).

AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).

AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).

AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).

AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).

Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).

Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).

\* cited by examiner

SYSTEM AND METHOD FOR CLONING AS SQL SERVER AG DATABASES IN A HYPERCONVERGED SYSTEM

CROSS-REFERENCE TO RELATED PATENT APPLICATIONS

This application is a continuation of U.S. patent application Ser. No. 17/122,740, filed Dec. 15, 2020, which claims the benefit and priority to U.S. Provisional Patent Application No. 63/065,925, filed Aug. 14, 2020, both of which are incorporated herein by reference in their entireties.

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a method is disclosed. The method includes creating, by a processor executing computer-readable instructions stored on a memory of a virtual computing system, a first Availability Group (AG) clone from a source database. The source database is stored on a primary replica node of an AG of the virtual computing system. The method also includes creating, by the controller, a second AG clone from the first cloned database and storing, by the Controller, the second AG clone on a secondary replica node of the AG. The second AG clone has a size of substantially zero.

In accordance with some other aspects of the present disclosure, a system is disclosed. The system includes an Availability Group (AG) in a virtual computing system, the AG having a primary replica node and at least one secondary replica node. The system also includes an Controller having a memory storing computer-readable instructions thereon and a processor that executes the computer-readable instructions to create a first AG clone from a source database. The source database is stored on the primary replica node. The processor further executes the computer-readable instructions to create a second AG clone from the first AG clone and store the second AG clone on the at least one secondary replica node. The second AG clone has a size of substantially zero.

In accordance with yet other aspects of the present disclosure, a non-transitory computer-readable media comprising computer-readable instructions stored thereon is disclosed. The computer-readable instructions when executed by a processor in a virtual computing system, causes the processor to create a first Availability Group (AG) clone from a source database, such that the source database is stored on a primary replica node of an AG, create a second AG clone from the first AG clone, and store the second AG clone on at least one secondary replica node of the AG. The second AG clone has a size of substantially zero.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
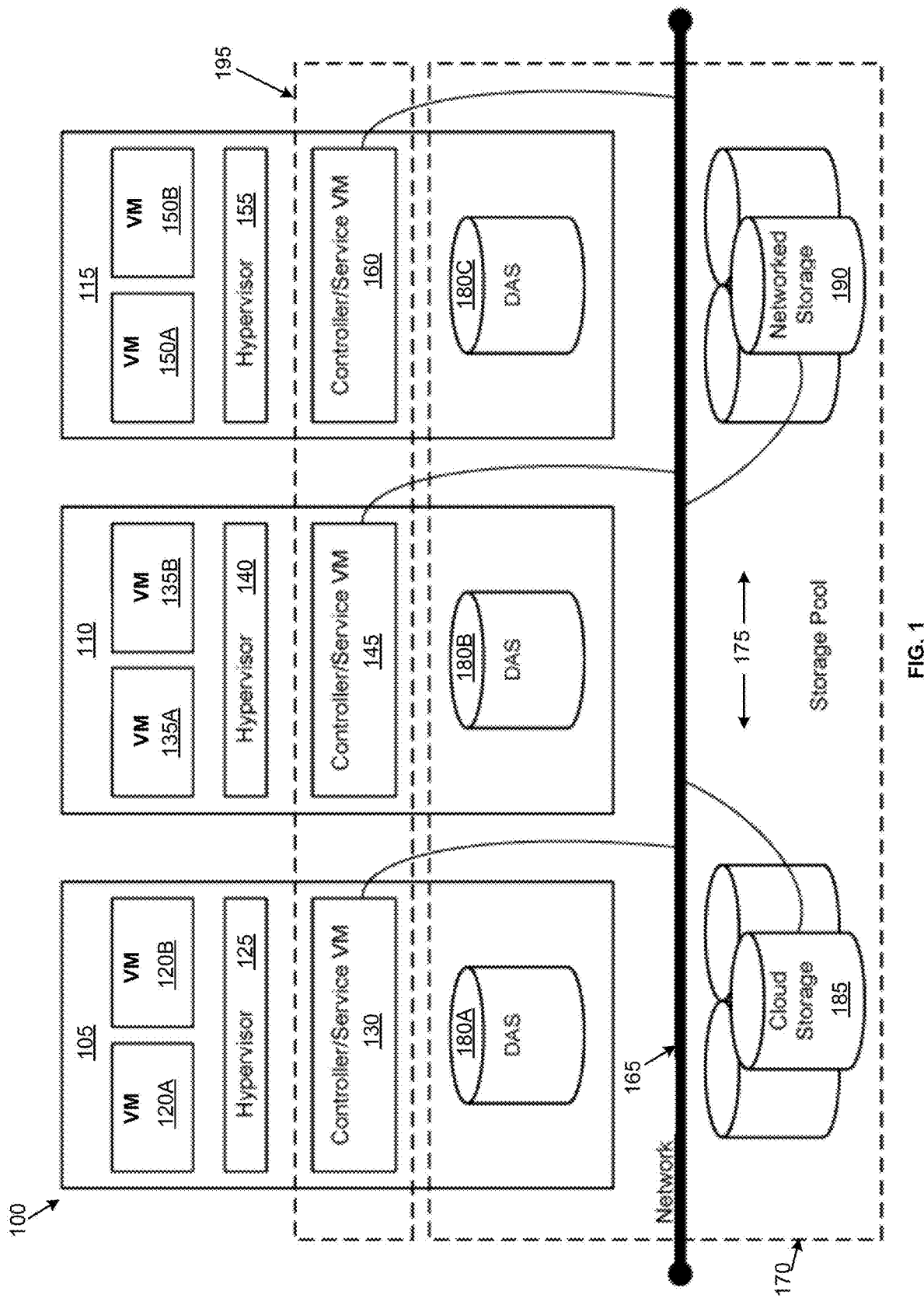
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a hyperconverged virtual computing system having a plurality of clusters, with each of the plurality of clusters having a plurality of nodes. Each of the plurality of nodes includes one or more virtual machines and other entities managed by an instance of a monitor such as a hypervisor. These and other components of the virtual computing system may be part of a datacenter, which may be managed by a user (e.g., an administrator or other authorized personnel). A distributed storage system, for providing storage and protection capabilities, may be associated with the virtual computing system. The virtual computing system may be configured for providing database management services.

In some embodiments, a client may enter into a Service Level Agreement ("SLA") with a site operator of a disaster recovery site for using the disaster recovery site. The disaster recovery site is a highly engineered and reliable virtual computing system that provides data recovery and data backup facilities to the client site in accordance with the SLA and maintains a continuity of operation of the client site in the aftermath of a disaster condition. A disaster condition may include planned outages, performance related failures, component failures, power failures, natural calamities, or any other condition that hampers the normal operation of the clusters at the client sites. Generally speaking, and as used herein, a disaster condition is any condition that causes hardware failure or otherwise prevents a hardware component from operating as intended, or results in a downtime at the client site. For example, a condition that causes a malfunction of any cluster at a client site or that significantly hampers the normal operation of any clusters is referred to as a disaster condition. The disaster condition is also referred to herein as a failover event. When the downtime of the client site is preplanned, the disaster condition or failover event may be a planned failover event. When the disaster condition of failover event is not preplanned, the disaster condition or failover event may be an unplanned failover event.

In some embodiments, the disaster recovery site may be part of an Always-On Availability Group ("AG") that provides replication of data to multiple locations. When a disaster condition is detected at one location, a replica of the data stored at another location may be used to maintain continuity of operation. Depending upon the number of locations at which the data is stored, and number of copies of the data at each location, significant storage resources may be needed to store all copies of the data. Such significant storage resources may be expensive to obtain and maintain. Further, as the amount of data increases, the number of locations to which the data is replicated increases, and/or the number of copies at each location increases, the amount of storage resources continues to increase. This continual increase and excess demand of storage resources may be impractical, and therefore undesirable.

The present disclosure provides technical solutions to greatly reduce the amount of storage resources needed in an Always-On AG for replicating data to multiple locations and making multiple copies of the data at each location. Specifically, the present disclosure provides a substantially zero sized AG clone, which may be replicated at multiple locations. Since the AG clone is substantially zero sized, the AG clone consumes essentially no extra space, thereby providing the ability to store data at any number of multiple locations and making any number of copies at each location at significantly lower storage cost.

In some embodiments, the present disclosure may be used in a test/development environment where a customer may want to setup and test their application functionality/simulation against an original or source database in its native configuration. Without the teachings of the present disclosure, to replicate the source database, the customer may consume a lot of additional space. For example, if an AG cluster with N nodes is desired, the source database may be copied to N nodes, requiring an extra storage space of (N−1)*size of the source database. Further, if multiple copies of the source database are desired on each node, the total storage space needed may be (N−1)*size of the source database*replication factor, where the replication factor is the number of copies needed on each node. Thus, depending upon the size of the source database, the number of nodes on which the source database is to be copied, and the number of copies desired on each node, the replication of the source database may consume a considerable amount of storage space.

With the present disclosure, the (N−1)*size of the source database*replication factor storage space may be significantly reduced by using AG clones, as discussed below. In a testing/development environment where minimal amounts of new data is being created, the AG clones may be used for the testing/development. Whenever the customer needs to get new data from the source database, a simple refresh of the environment (e.g., updating AG clones or creating new AG clones) may be performed. It is to be understood that testing/development is simply an example and is not intended to be limiting in any way. The AG clones may be used for other purposes as well.

Thus, the present disclosure provides an easy, convenient, cost effective, and user-friendly mechanism for creating and maintaining an Always-On AG cluster.

Referring now to FIG. 1, a cluster 100 of a hyperconverged virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes virtual machines ("VMs") 120A and 120B (collectively referred to herein as "VMs 120"), a hypervisor 125 configured to create and run the VMs, and a controller/service VM 130 configured to manage, route, and otherwise handle workflow requests between the various nodes of the cluster 100. Similarly, the second node 110 includes VMs 135A and 135B (collectively referred to herein as "VMs 135"), a hypervisor 140, and a controller/service VM 145, and the third node 115 includes VMs 150A and 150B (collectively referred to herein as "VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two VMs (e.g., the VMs 120, the VMs 135, the VMs 150) are shown on each of the first node 105, the second node 110, and the third node 115, in other embodiments, the number of the VMs on each of the first, second, and third nodes may vary to include other numbers of VMs. Further, the first node 105, the second node 110, and the third node 115 may have the same number of VMs (e.g., the VMs 120, the VMs 135, the VMs 150) or different number of VMs.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units or processors configured to execute instructions. The instructions may be carried out by a special purpose computer, logic circuits, or hardware circuits of the first node 105, the second node 110, and the third node 115. The processing units or processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units or processors, thus, execute an instruction, meaning that they perform the operations called for by that instruction.

The processing units or processors may be operably coupled to the storage pool 170, as well as with other elements of the first node 105, the second node 110, and the third node 115 to receive, send, and process information, and to control the operations of the underlying first, second, or third node. The processing units or processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units or processors may execute instructions without first copying the instructions to the RAM. Further, the processing units or processors may include a single stand-alone processing unit or processor, or a plurality of processing units/processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, and/or any other type of suitable primary and/or secondary memory. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the VMs 120, the VMs 135, and the VMs 150.

Each of the VMs 120, the VMs 135, the VMs 150 is a software-based implementation of a computing machine. The VMs 120, the VMs 135, the VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the VMs 120, the VMs 135, the VMs 150 that may run its own operating system and applications on the underlying physical resources just like a real computer. By encapsulating an entire machine, including CPU, memory, operating system, storage devices, and network devices, the VMs 120, the VMs 135, the VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the VMs 120, the VMs 135, and the VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the VMs 120, the VMs 135, the VM 150A, and the VM 150B) from the storage pool 170 to perform one or more functions.

By running the VMs 120, the VMs 135, and the VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new VMs are created (e.g., installed) on the first node 105, the second node 110, and the third node 115, each of the new VMs may be configured to be associated with certain hardware resources, software resources, storage resources, and other resources within the cluster 100 to allow those virtual VMs to operate as intended.

The VMs 120, the VMs 135, the VMs 150, and any newly created instances of the VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the VMs 120, the VMs 135, and the VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the VMs 120, the VMs 135, the VM 150A, and the VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular VM (e.g., the VMs 120, the VMs 135, or the VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
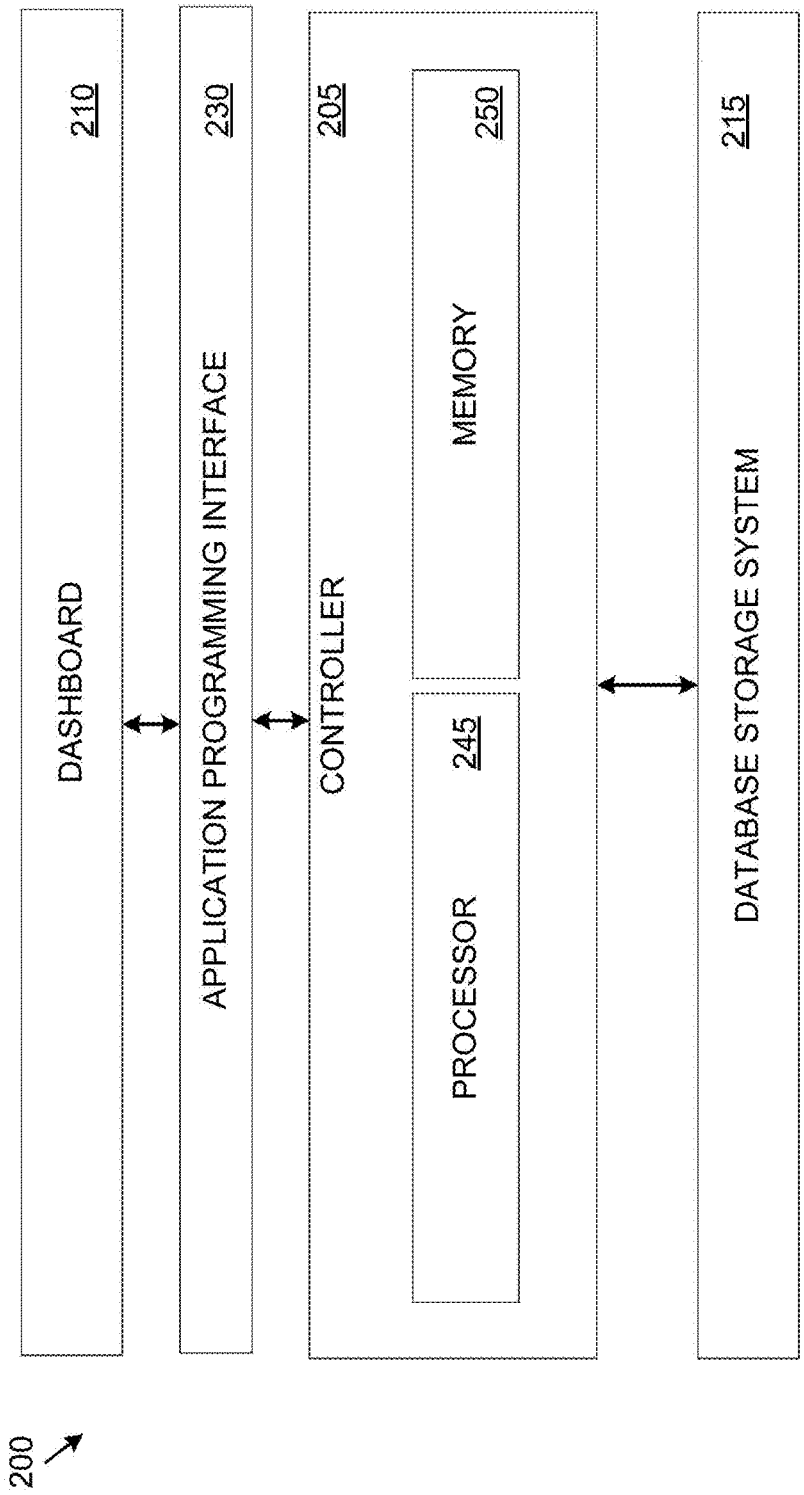
FIG. 2 is an example block diagram of a database protection system of the virtual computing system of FIG. 1, in accordance with some embodiments of the present disclosure.

Turning now to FIG. 2, an example block diagram of a database protection system 200 is shown, in accordance with some embodiments of the present disclosure. FIG. 2 is discussed in conjunction with FIG. 1. The database protection system 200 or portions thereof may be configured as utility software for implementing one or more database management services, such as database protection. Database protection may include creating and managing clones or copies of a database to allow continuity of operation when the underlying node hosting the database goes offline, as discussed in greater detail below. To provide database protection, the database protection system 200 includes a controller 205 that is configured to receive input from and provide output to a user via a dashboard 210. In some embodiments, the controller 205 may be an Era server or Era controller provided by Nutanix, Inc. In other embodiments, the controller 205 may be another type of Availability Group ("AG") controller or server that is suitable for performing the functions described herein. The controller 205 is also associated with a database storage system 215 that is configured to store one or more databases. In some embodiments, the database storage system 215 may be provisioned from the storage pool 170. In association with the dashboard 210 and the database storage system 215, the controller 205 is configured to implement one or more database protection services. For example, the controller 205 is configured to create an AG cluster and an AG clone to protect one or more databases stored within the database storage system 215.

In some embodiments, the database protection system 200 or at least parts thereof may be installed on and accessed via a VM (e.g., the VMs 120, the VMs 135, the VMs 150 of FIG. 1) of the cluster 100. In some embodiments, the database protection system 200 may be installed via the controller/service VM (e.g., the controller/service VM 130, the controller/service VM 145, the controller/service VM 160) of the node (e.g., the first node 105, the second node 110, and the third node 115) on which the database protection system is to be installed. For example, an administrator desiring to install the database protection system 200 may download a copy on write image file (e.g., qcow or qcow2 image file) on the controller/service VM to define the content and structure of a disk volume to be associated with the database protection system. In some embodiments, instead of a copy on write image file, another type of disk image file, depending upon the type of underlying hypervisor, may be installed. Further, the administrator may create or one or more new VMs on which the database protection system 200 is to reside. As part of creating the VMs, the administrator may allocate a particular number of virtual central processing units (vCPU) to each of the VMs, define the number of cores that are desired in each vCPU, designate a specific amount of memory to each of the VMs, and attach the database storage device (e.g., one or more virtual disks from the storage pool 170) with each of the VMs. In some embodiments, at least a portion of the database storage device attached to the database protection system 200 may form the database storage system 215. The administrator may also create a new network interface (e.g., associate a virtual local area network (VLAN), assign an Internet Protocol ("IP") address to access the database protection system 200, etc.) with each of the VMs. The administrator may perform additional and/or other actions to create the VMs on which the database protection system 200 resides upon creation and installation of the disk image file.

In some embodiments, the VMs on which the database protection system 200 resides may all be located on a single node (e.g., one of the first node 105, the second node 110, and the third node 115). In other embodiments, the VMs on which the database protection system 200 resides may be spread across multiple nodes within a single cluster, or possibly amongst multiple clusters. When spread across multiple clusters, each of the associated multiple clusters may be configured to at least indirectly communicate with one another to facilitate operation of the database protection system 200. Upon installing the database protection system 200, a user (e.g., the administrator or other user authorized to access the database system) may access the dashboard 210. The dashboard 210, thus, forms the front end of the database protection system 200 and the Controller 205 and the database storage system 215 form the backend of the database protection system.

The database protection system 200 may be accessed via a computing device configured to access the VM(s) on which the database protection system resides. In other embodiments, instead of or in addition to being accessible via a particular computing device, the database protection system 200 may be hosted on a cloud service and may be accessed via the cloud. In some embodiments, the database protection system 200 may additionally or alternatively be configured as a mobile application suitable for access from a mobile computing device (e.g., a mobile phone). In some embodiments, the database protection system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database protection system 200 is installed.

In some embodiments and when the dashboard 210 is configured for access via the API 230, the user may access the dashboard via a web browser and upon entering a uniform resource locator ("URL") for the API such as the IP address of the database protection system 200 or other web address. Using the API 230 and the dashboard 210, the users may then send instructions to the Controller 205 and receive information back from the database engine. In some embodiments, the API 230 may be a representational state transfer ("REST") type of API. In other embodiments, the API 230 may be any other type of web or other type of API (e.g., ASP.NET) built using any of a variety of technologies, such as Java, .Net, etc., that is capable of accessing the Controller 205 and facilitating communication between the users and the Controller. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database protection system 200 may be configured for access in other ways.

The dashboard 210 provides a user interface that facilitates human-computer interaction between the users and the controller 205. The dashboard 210 is configured to receive user inputs from the users via a graphical user interface ("GUI") and transmit those user inputs to the controller 205. The dashboard 210 is also configured to receive outputs/information from the controller 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database protection system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the Controller 205 to perform the functions described herein.

Thus, the dashboard receives a user request (e.g., an input) from the user and transmits that user request to the controller 205. In some embodiments, the user request may be to request creation of an AG cluster. For example, in some embodiments, the user request may request creation of a 3 node AG cluster having a replication factor of 2. In other words, the user request may request that a database or a group of databases be replicated to 3 separate nodes with each node having 2 copies of the database or group of databases. It is to be understood that the example above and any other examples used throughout the disclosure are only for explanation and are not intended to be limiting in any way. In response to the user request for creation of an AG cluster, the controller 205 may cause the database or the group of databases to be replicated to 3 nodes with a replication factor of 2. An example of an AG cluster is discussed in FIG. 3 below.

The controller 205 may be configured as a logic circuit, and/or operate in association with, hardware, software, firmware, or a combination thereof. Specifically, the controller 205 may include a processor 245 configured to execute instructions for implementing the database management services of the database protection system 200. The processor 245 may be implemented in hardware, firmware, software, or any combination thereof "Executing an instruction" means that the processor 245 performs the operations called for by that instruction. The processor 245 may retrieve a set of instructions from a memory for execution. For example, in some embodiments, the processor 245 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 245 may be configured to execute instructions without first copying those instructions to the RAM. The processor 245 may be a special purpose computer, and include logic circuits, hardware circuits, etc. to carry out the instructions. The processor 245 may include a single stand-alone processing unit, or a plurality of processing units that use the same or different processing technology. The instructions may be written using one or more programming language, scripting language, assembly language, etc.

The controller 205 may also include a memory 250. The memory 250 may be provisioned from or be associated with the storage pool 170. In some embodiments, the memory 250 may be separate from the storage pool 170. The memory 250 may be any of a variety of volatile and/or non-volatile memories that may be considered suitable for use with the controller 205. In some embodiments, the memory 250 may be configured to store the instructions that are used by the processor 245.

Further, the controller 205 may be configured to handle a variety of types of database engines. For example, in some embodiments, the Controller 205 may be configured to manage PostgreSQL, Oracle, Microsoft SQL server, and MySQL database engines. In other embodiments, the controller 205 may be configured to manage other or additional database engines. Each database that is stored with the database protection system 200 may be of a particular "database engine type." The database engine type may identify the type of database management system (e.g., Oracle, PostgreSQL, etc.) of a particular database. By virtue of associating a database with a particular database engine type, that database is managed in accordance with the rules of that database engine type. Thus, the controller 205 is configured to be operable with and manage databases associated with a variety of database engine types. Although the present disclosure is discussed in the context of SQL database engine types, the present disclosure may be implemented for other types of database engine types as well.

It is to be understood that only some components of the controller 205 are shown and discussed herein. In other embodiments, the controller 205 may also include other components that are considered necessary or desirable in implementing the functions discussed herein. In other embodiments, the controller 205 may be other types of controllers or servers configured to perform the functions described herein.

Figure 3:
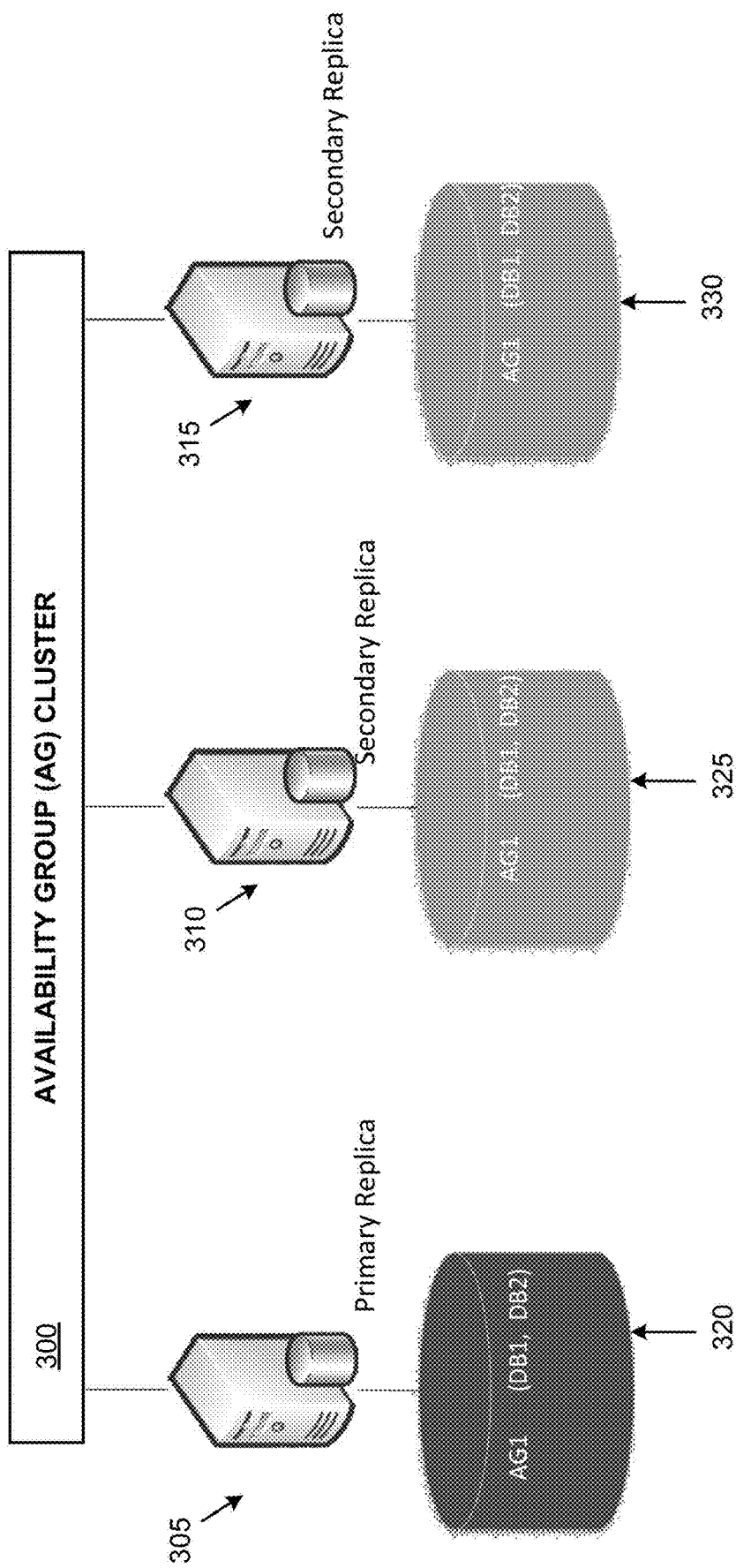
FIG. 3 is an example block diagram showing an Availability Group ("AG") cluster of the virtual computing system of FIG. 1, in accordance with some embodiments of the present disclosure.

Turning now to FIG. 3, an example block diagram of an AG cluster 300 is shown, in accordance with some embodiments of the present disclosure. The AG cluster 300 may be used to provide a replicated environment for a set of availability databases (e.g., a source database). By providing a replicated environment, the AG cluster 300 may store multiple copies of the set of availability databases (e.g., copies of the source database in multiple locations). Thus, in some embodiments, the AG cluster 300 may include a plurality of nodes for storing the multiple copies of the set of availability databases, and each of the plurality of nodes may be designated as either a primary replica node or a secondary replica node. For example, in some embodiments, the AG cluster 300 may include a primary replica node 305 and secondary replica nodes 310 and 315. Each of the primary replica node 305 and the secondary replica nodes 310 and 315 may have similar elements as the first node 105, the second node 110, and/or the third node 115. Because there are three total number of nodes (e.g., the primary replica node 305 and the secondary replica nodes 310, 315) in the AG cluster 300, the AG cluster provides an AG of 3. It is to be understood that in other embodiments, the AG cluster 300 may include greater than or less than two secondary replica nodes. In some embodiments, the AG cluster 300 may include greater than one primary replica node. In other words, the AG cluster 300 may have an availability group of greater than 3 or less than 3.

Further, in some embodiments, the primary replica node 305 and each of the secondary replica nodes 310 and 315 may be part of the same cluster (e.g., the cluster 100), while in other embodiments, one or more of the primary replica node and/or one or more of the secondary replica nodes may be part of separate clusters.

The AG cluster 300 is shown to include a set of availability databases 320 (e.g., DB1, DB2). Although the set of availability databases 320 is shown to include two databases (e.g., DB1, DB2), in other embodiments, the set of availability databases may include a single availability database or greater than two availability databases. Further, although the set of availability databases 320 are described as being stored on "nodes," it is to be understood that the set of availability databases are in fact stored on one or more storage devices associated with those "nodes." The one or more storage devices may be associated with one or more VMs installed on those "nodes." Thus, for example, the set of availability databases 320 may be stored within the storage pool 170, the database storage system 215, and/or stored in any other designated storage associated with the VMs on the primary replica node 305 of the AG cluster 300. The set of availability databases 320 may be hosted on the primary replica node 305 and replicated, for database protection, to the secondary replica nodes 310 and 315 of the AG cluster 300 as copies 325 and 330, respectively. It is to be understood that although the description above describes and FIG. 3 shows creating copies of the entire set of availability databases 320 (e.g., DB1, DB2), in some embodiments, copies of only a subset of the set of availability databases may be created. Thus, in some embodiments, one or more copies of one or more databases (e.g., DB1 or DB2) in the set of availability databases 320 may be created and stored on the secondary replica nodes 310 and 315. Further, although not shown, in some embodiments, one or more copies of one or more databases in the set of availability databases 320 may be stored on the primary replica node 305 as well.

In some embodiments, read/write operations on the databases (DB1, DB2) of the set of availability databases 320 may be performed on the primary replica node 305. In some embodiments, the copies 325 and 330 of the set of availability databases 320 on each of the secondary replica nodes 310 and 315, respectively, may be updated, synchronously or asynchronously, based on the set of availability databases on the primary replica node 305. Synchronous replication may entail updating the copies 325, 330 (or creating new copies and deleting the old ones) instantaneously or substantially instantaneously as changes are made to any database in the set of availability databases 320 on the primary replica node 305, thereby ensuring that the copies are constantly updated. Asynchronous replication may entail updating the copies 325, 330 (or creating new copies and deleting the old ones) on the secondary replica nodes 310 and 315 periodically (e.g., not instantaneously or substantially instantaneously).

By maintaining the copies 325 and 330 on the secondary replica nodes 310 and 315, respectively, when the primary replica node 305 becomes unavailable (e.g., due to a disaster condition), the set of availability databases 320 may be accessed and operated using the copies 325 and/or 330, thereby ensuring continuity of operation. In some embodiments, when the primary replica node 305 fails, the controller 205 may automatically switch to one of the secondary replica nodes 310 or 315, which may assume the role of the primary replica node. Thus, the secondary replica nodes 310 and 315 may be used for disaster recovery purposes. In some embodiments, in addition to disaster recovery or instead of disaster recovery, the secondary replica nodes 310 and 315 may be used for read balancing. For example, when the primary replica node 305 is servicing a high volume of read requests (e.g., read requests greater than a predetermined threshold) on the set of availability databases 320, and since read requests do not require modification of data, in some embodiments, at least some of those read requests may be serviced from the copies 325 and/or 330, respectively, to provide read balancing. By providing read balancing, read requests may be serviced faster without overloading the resources of the primary replica node 305. In some embodiments, the secondary replica nodes 310, 315 may be used for other purposes (e.g., testing, etc.)

Additionally, since in FIG. 3, a single copy (e.g., the copies 325 and 330) of the set of availability databases 320 exists on each of the secondary replica nodes 310, 315, the AG cluster 300 has a replication factor of 1. In other embodiments, more than one copy of the set of availability databases may be provided on one or more of the secondary replica nodes 310 and 315 to have a replication factor of greater than 1. In some embodiments, each of the secondary replica nodes 310 and 315 may have the same number of copies such that the replication factor of each of the secondary replica nodes is the same. In other embodiments, each (or at least some) of the secondary replica nodes 310 and 315 may have a replication factor that is different from the other secondary replica nodes. Thus, in some embodiments, the replication factor on the secondary replica node 310 may be different from the replication factor on the secondary replica node 315. Further, although not shown, the primary replica node 305 may also store a copy of one or more databases of the set of availability databases 320. The replication factor on the primary replica node 305 may be same as or different from the replication factor on the secondary replica nodes 310 and/or 315.

Figure 4:
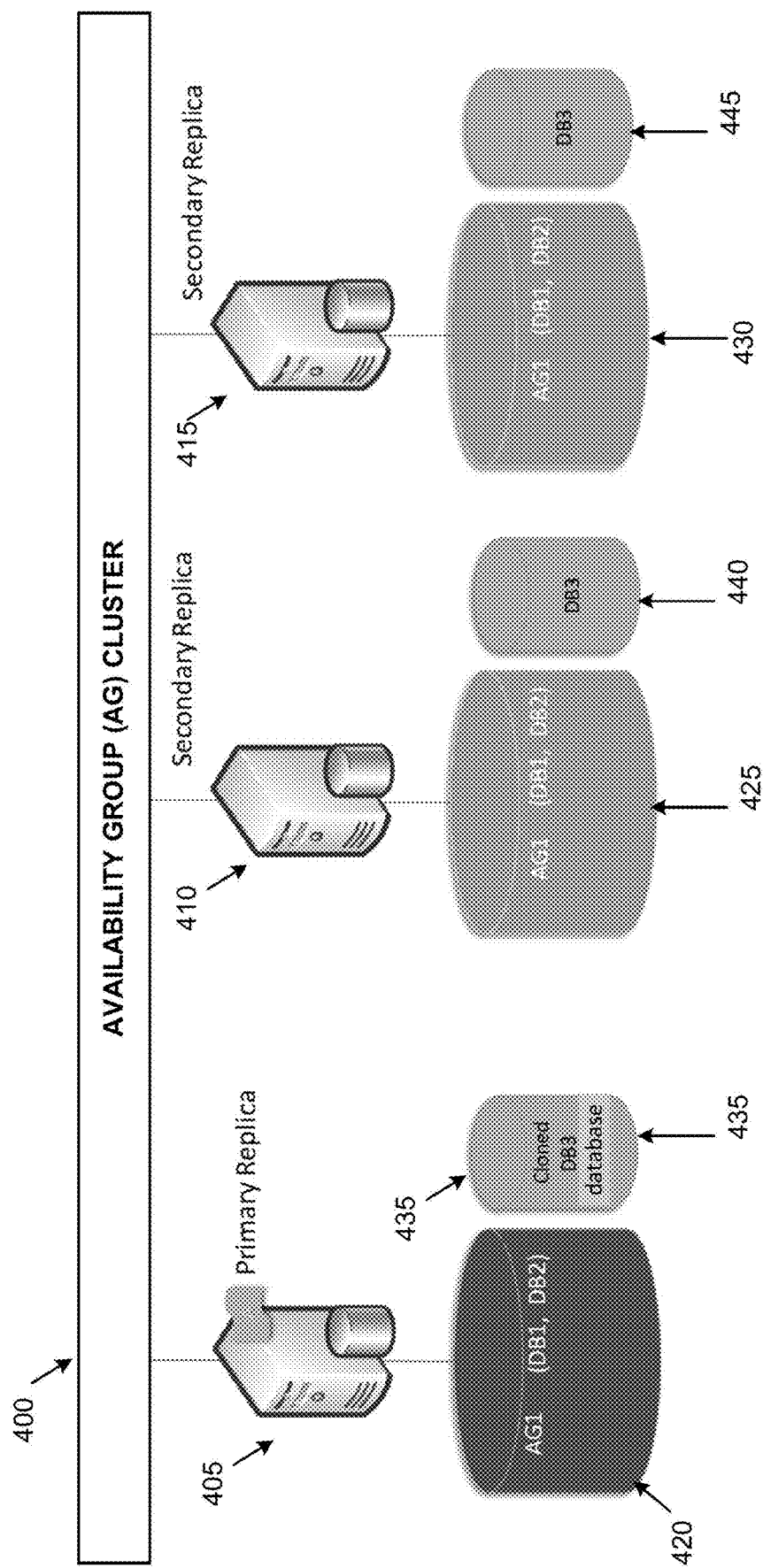
FIG. 4 is another example block diagram showing an AG cluster of the virtual computing system of FIG. 1, in accordance with some embodiments of the present disclosure.

Referring to FIG. 4, another example AG cluster 400 is shown, in accordance with some embodiments of the present disclosure. The AG cluster 400 is similar to the AG cluster 300 in that the AG cluster 400 also includes a primary replica node 405 that is equivalent to the primary replica node 305, and secondary replica nodes 410 and 415, which are equivalent to the secondary replica nodes 310 and 315, respectively. Also similar to the AG cluster 300, the primary replica node 405, the secondary replica node 410, and/or the secondary replica node 415 may be part of the same cluster or different clusters. The number of primary replica nodes and/or number of secondary replica nodes may also vary in other embodiments. Additionally and similar to the AG cluster 300, the AG cluster 400 provides a replicated environment to a set of availability databases 420 (e.g., DB1, DB2). Although two databases are shown in the set of availability databases 420, in other embodiments, the number of databases in the set of availability databases may vary. The set of availability databases 420 may be hosted on the primary replica node 405 such that read write operations may be performed on the set of availability databases from the primary replica node. Copies 425 and 430 of the set of availability databases 420 may be stored on the secondary replica nodes 410 and 415, respectively.

The AG cluster 400 also shows how one or more databases in the set of availability databases 420 on the primary replica node 405 may be replicated to the secondary replica nodes 410 and 415, while achieving storage savings. For example, say a replication factor of 2 is desired on each node, meaning that two copies of the one or more databases of the set of availability databases 420 are to exist on the primary replica node 405 and each of the secondary replica nodes 410 and 415. In some embodiments, to replicate the one or more databases of the set of availability databases 420 on the primary replica node 405 and each of the secondary replica nodes 410 and 415, a clone of the one or more databases of the set of availability databases 420 may be made. The clone may be called an AG clone.

To create an AG clone, all data used by the database/VM on which the set of availability databases 420 resides may need to be copied. In some embodiments, to create the clone of a database of the set of availability databases 420, a snapshot of that database (e.g., the storage disk or VM disk within which the data of the database is stored) may be captured to obtain a cloned disk. The cloned disk may be saved to the primary replica node 405 and each of the secondary replica nodes 410 and 415. In some embodiments, in addition to the snapshot, one or more transactional logs of the database being replicated may also be captured. Transactional logs may be captured between capture of two snapshots, such that the number of transactional logs that are captured are greater than the number of snapshots that are captured within a given time period. The transactional logs may then be applied to the cloned disk. Thus, a replicated point in time copy of the database may be created from a snapshot and one or more transactional logs. The frequency at which snapshots and transactional logs are captured may be defined based on a protection schedule associated with the set of availability databases 420.

For example, say the protection schedule defines capturing a daily snapshot of the set of availability databases 420 at 9:00 AM every day and capturing a transactional log of the set of availability databases every hour between the capture of two snapshots. Thus, to create a point in time clone of a database of the set of availability databases 420, say at 8:00 AM on Day 2, the snapshot captured at 9:00 AM the previous day (e.g., Day 1), as well as the transactional logs captured every hour since 9:00 AM on Day 1 to 8:00 AM on Day 2 may be used to create the cloned database of the set of availability databases.

Replicating one or more databases of the set of availability databases 420 as discussed above by creating/storing cloned disks, as well as applying transactional logs to each of the cloned disks may need a lot of storage space. For example, in some embodiments, if a database of the set of availability databases 420 that is being replicated is 500 Gigabytes ("GB") in size, to create three replicas of the database—one on each of the primary replica node 405 and the secondary replica nodes 410 and 415, an additional storage space of 500*3 GB or 1.5 Terabytes ("TB") may be needed. This may be expressed using the following formula for a point in time restore: ((N*size of data to be cloned)+(N*size of log applied))*Replication Factor, where N is the number of nodes in the availability group (e.g., 3 in FIG. 4—one primary replica node and two secondary replica nodes), "size of log applied" is the total size of all the transactional logs that are applied to the cloned disk, the "size of data to be cloned" is the size of the database of the set of availability databases 420 being replicated at the instant the cloned disk is created, and the "Replication Factor" is the number of replicas of the database that are desired.

Depending upon the number of nodes in the availability group, as well as the replication factor that is desired, the amount of storage space needed to replicate the database may increase significantly. Consuming such large amounts of storage may not be practical, may be expensive to obtain and maintain, and therefore, generally undesirable. To avoid consuming such large amounts of storage space, while achieving the same benefits of replicating one or more databases of the set of availability databases 420, as discussed above, the present disclosure provides a substantially zero sized AG clone, which may be stored on the primary replica node 405 and the secondary replica nodes 410 and 415. By being substantially zero sized, the AG clone provides considerable space savings over the replication mechanism discussed above.

To create a substantially zero sized AG clone of a database of the set of availability databases 420, a linked cloned disk of the database may be created. The database whose AG clone is being created is referred to herein as a source database. An example of creating a linked cloned disk is described in U.S. application Ser. No. 15/885,758, titled "Cloning Services in Virtualized Computing Systems" and filed on Jan. 31, 2018, the entirety of which is incorporated by reference herein. In some embodiments, to create a linked cloned disk, a snapshot of the source database may be taken and the linked cloned disk may be created based on the snapshot. The linked cloned disk includes links, pointers, or references to memory blocks of the original storage disk associated with the source database. Thus, the linked cloned disk does not include a copy of the data of the source database. Rather, the linked cloned disk includes pointers to the storage disks of the source database. Further, to create the AG clone, in some embodiments, one or more transactional logs may be applied to the linked cloned disk. Thus, the AG clone may include a combination of a linked cloned disk and one or more transactional logs applied to the linked cloned disk. The one or more transactional logs may or may not have data therein. In other words, in some embodiments, the one or more transactional logs may be empty.

The AG clone created from the linked cloned disk to which one or more transactional logs have been applied may be brought online (e.g., restored). Once restored, the AG clone may reflects a point in time copy of the source database. A snapshot of the restored AG clone may be taken and that snapshot may be used to create additional AG clones. In some embodiments, the AG clone created from the linked cloned disk to which one or more transactional logs have been applied may be restored on the same node as the node on which the source database is stored (e.g., the primary replica node 405). The AG clone created from the linked cloned disk to which one or more transactional logs have been applied may be considered an initial AG clone. In other embodiments, the initial AG clone may be restored on one of the secondary replica nodes 410 or 415.

The additional AG clones that may be created from the initial AG clone may be stored on the primary replica node 405 and/or one or more of the secondary replica nodes 410, 415. The additional AG clones may include a linked cloned disk created from the snapshot taken from the initial AG clone. In contrast to the initial AG clone in which the one or more transactional logs that are applied to the linked cloned disk contain data, the transactional logs that are applied to the additional AG clones are empty. Since the snapshot taken from the initial AG clone reflects a point in time copy of the source database, the snapshot of the initial AG clone also reflects the point in time copy of the source database.

Thus, each of the additional AG clones includes the linked cloned disk to which an empty transactional log has been applied. Similar to the linked cloned disk of the initial AG clone, the linked cloned disks of each of the additional AG clones may include links, pointers, or references to the storage disks of the source database. Since the linked cloned disks of each of the initial AG clone and the additional AG clones contains pointers to memory blocks of the source database as opposed to storing actual data, the linked cloned disks may be considered substantially zero sized. Specifically, the linked cloned disks consume space that is needed for storing the pointers to the storage disks of the source database. The space consumed by these pointers may be considered negligible compared to the space needed by the actual data. Thus, the linked cloned disks may be considered essentially zero sized.

For example, in some embodiments, when a replication factor of 2 is desired, the initial AG clone may be stored on the primary replica node 405 and two copies of additional AG clones may be stored on each of the secondary replica nodes 410, 415. When access to the data of the source database using the initial AG clone or the additional AG clones is desired, the pointers in those AG clones may be used to access the memory blocks of the source database.

Thus, in some embodiments and as shown in FIG. 4, an initial AG clone 435 (e.g., DB3) of a source database (e.g., DB1 or DB2) may be created on the primary replica node 405. For purposes of explanation, the initial AG clone 435 is a clone of DB1. In other embodiments, a similar AG clone may be created for DB2 as well of the set of availability databases 420. To create the initial AG clone 435, a linked clone disk from the snapshot of the storage disk(s) associated with the source database (e.g., DB1) may be created. To this linked cloned disk, one or more transactional logs taken from the source database may be applied to obtain the initial AG clone 435. These one or more transactional logs contain data of the source database. Thus, the initial AG clone is a point in time copy of the source database. Further, the linked cloned disk of the initial AG clone 435 is essentially zero sized. However, since the transactional logs that are applied to the linked cloned disk contain data, the initial AG clone 435 consumes storage space that corresponds to the size of the transactional logs. In some embodiments, one or more storage disks may be associated with the initial AG clone 435. The initial AG clone 435 includes pointers to storage disk(s) of the source database where the data of the source database is stored. The initial AG clone 435 may be restored on the primary replica node 405. In other embodiments, the initial AG clone 435 may be restored on one of the secondary replica nodes 410, 415 instead. In some embodiments, the initial AG clone 435 may be associated with a separate virtual machine than the original source database (e.g., DB1).

Upon creating and restoring the initial AG clone 435, snapshots of the initial AG clone may be taken and may be used to create additional AG clones. Thus, a snapshot of the storage disk(s) of the initial AG clone 435 may be taken to create additional AG clones. Specifically, for each additional AG clone, a linked cloned disk may be created from the snapshot of the initial AG clone 435. Since the linked cloned disk only contains pointers, the linked cloned disks of the additional AG clones are substantially zero sized. In some embodiments, an empty transactional log may also be captured from the initial AG clone 435. An empty transactional log may not have any data therein, and therefore, may be zero sized or substantially zero sized.)

The empty transactional log may be applied to the linked cloned disk created from the initial AG clone 435 to obtain an additional AG clone. The additional AG clone may be stored on the secondary replica nodes 410 and 415. For example, additional AG clones 440 and 445 (e.g., copies of DB3) may be created using the empty transactional log and the linked cloned disk captured from the initial AG clone 435. Since the linked cloned disk of each of the additional Ag clones 440, 445 is essentially zero sized and the transactional log is essentially zero sized (since there is no data therein), the additional AG clones are essentially zero sized. Thus, the additional AG clones 440 and 445 are the same point in time replicas of the source database as the initial AG clone 435 but consume a lower amount of storage space compared to the initial AG clone (e.g., since the additional AG clones have empty transactional logs while the initial AG clone has transactional logs with data). Continuing the example above of a 500 GB size for the source database, the initial AG clone 435 and the additional AG clones 440, 445, thus, consume one third the amount of space or a total of 0.5 TB space (e.g., the size of the transactional logs applied to the initial AG clone), thereby providing significant storage savings. In some embodiments, each of the additional AG clones 440 and 445 may be on separate virtual machines than the copies 425 and 430, respectively of the source database (e.g., DB1).

Thus, the present disclosure provides a mechanism to create an AG group with considerable space savings. Specifically, the present disclosure discloses a mechanism in which a first AG clone (e.g., the initial AG clone 435) is created from a source database in the set of availability databases 420. The first AG clone is a point in time copy of the source database. From the first AG clone, one or more second AG clones (e.g., the additional AG clones 440 and 445) may be created. These one or more second AG clones may also be the same point in copy of the source database as the first AG database. When data is desired to be read using the first AG clone or the one or more second AG clones, the pointer of the location from which the data is to be read may be used to access that location in the storage disk(s) of the source database. The data may then be read from the storage disk(s) of the source database. When data is to be written using the first AG clone or the one or more second AG clones, a new memory block may be created at the AG clone where the write operation is being performed. The data is written to that newly created memory block. In some embodiments, instead of creating the new memory block at the AG clone where the write operation is being performed, a new memory block may be created at the storage disk(s) of the source database and a pointer to that new memory block may be added to the linked cloned disk of that AG clone. Thus, each of the first and second AG clones may perform write operations without impacting the original data of the source database.

Figure 5:
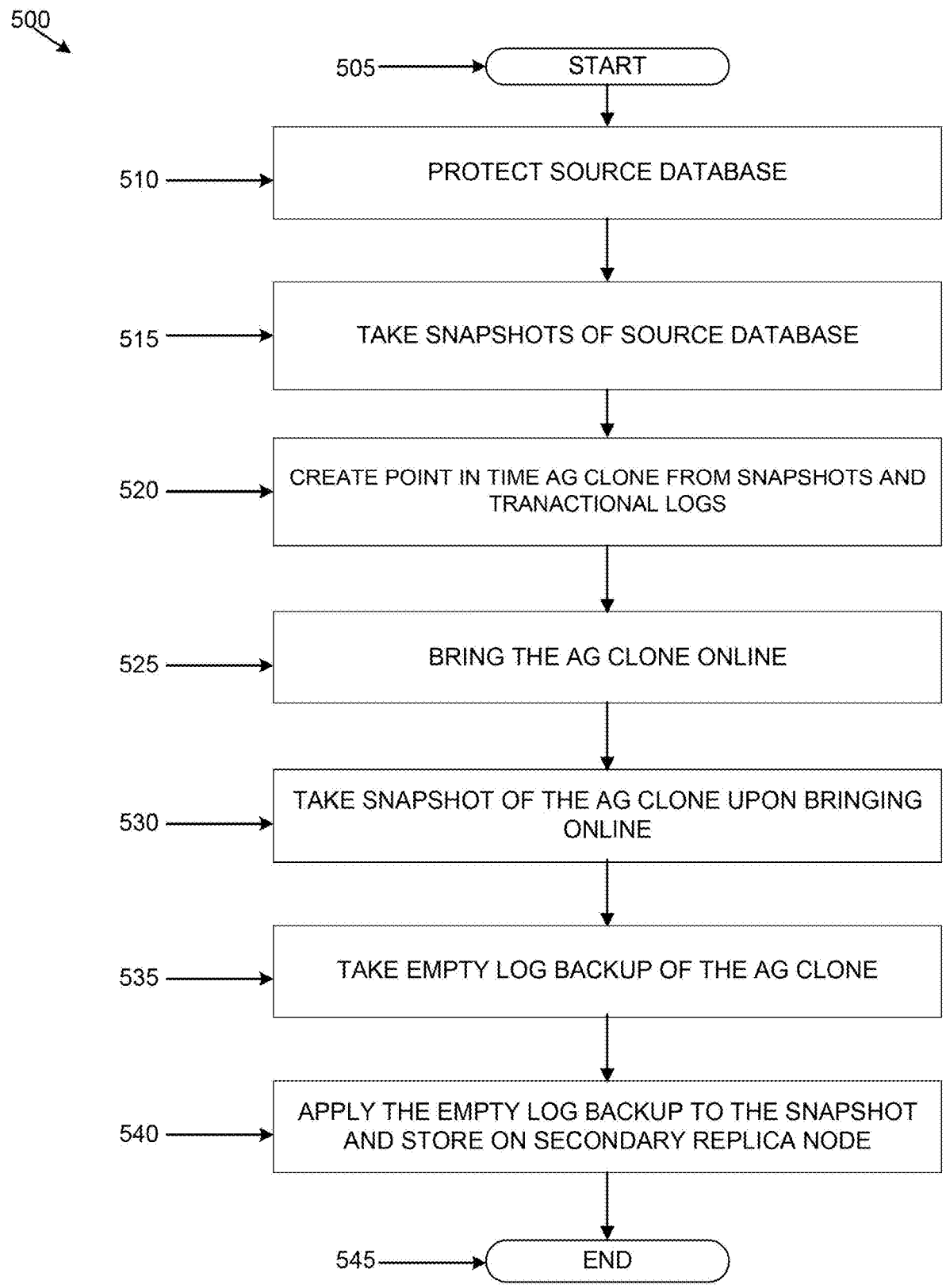
FIG. 5 is an example flowchart outlining operations for creating an AG clone in the AG cluster of FIGS. 3 and 4, in accordance with some embodiments of the present disclosure.

Turning now to FIG. 5, an example flow chart outlining operations of a process 500 is shown, in accordance with some embodiments of the present disclosure. The process 500 may include additional, fewer, or different operations, depending on the particular embodiment. The process 500 may be used to create AG clones of a source database in an AG cluster. The process 500 is discussed in conjunction with FIGS. 2-4 and is implemented by the controller 205 of FIG. 2. For purposes of explanation, the elements of the AG cluster 400 are used below. However, the process 500 may be applied to any AG cluster of any availability group size and any replication factor. The process 500 starts at operation 505 with an AG cluster (e.g., the AG cluster 400) having a plurality of nodes (e.g., 3), including a primary replica node (e.g., the primary replica node 405) and at least one secondary replica node (e.g., the secondary replica nodes 410, 415). The AG cluster 400 may also have a replication factor (e.g., 2) determining the number of copies (e.g., 2) of the source database that are needed on each of the primary replica node and the secondary replica nodes. In some embodiments, the number of nodes in the availability group and the replication factor may be user defined.

In some embodiments, a new AG cluster and a new AG may be defined on which AG clones according to the process 500 may be created and stored. In other embodiments, an existing AG cluster may be used. A new AG may be defined on the existing AG cluster to create and store the AG clones described herein. In yet other embodiments, the process 500 may be applied to an existing AG cluster and an existing AG.

In some embodiments, the set of availability databases 420 may reside primarily on the primary replica node 405. The source database (e.g., DB1) may be part of the set of availability databases 420. The source database may be associated with a virtual machine of the primary replica node 405. The virtual machine may be associated with one or storage disks (e.g., virtual disks) on which the data of the source database, as well as any metadata associated with the source database and the virtual machine is stored. Thus, in some embodiments, the source database may also reside on the primary replica node 405 and read/write operations may be performed on the source database during normal operations.

To create the AG cluster, the source database may be copied to one or more secondary replica nodes depending upon the number of nodes in the availability group. For example, if the number of nodes in the availability group is 3, the source database may be copied to two secondary replica nodes, such that the source database is located on 3 nodes (1 primary replica node and 2 secondary replica nodes). In addition, depending upon the replication factor, additional copies (e.g., AG clones) of the source database may be made on each of the primary and secondary replica nodes. In some embodiments, the AG clones may be "point in time" clones of the source database. In other words, the AG clones may be copies of the source database at a desired point in time. To create AG clones of the source database on the primary replica node 405 and the secondary replica nodes 410, 415, the source database needs to be protected.

To protect the source database, a protection schedule may be defined for the source database at operation 510. In some embodiments, the protection schedule may be user defined. The protection schedule may define a frequency of capturing snapshots and transactional logs. For example, in some embodiments, the protection schedule may define that X number of snapshots are to be captured within a designated time period. For example, the protection schedule may define that a snapshot is to be captured every day at 8:00 AM and at 8:00 PM.

However, the number of snapshots that are captured in a given day may be limited. Specifically, because capturing a snapshot requires quiescing (e.g., pausing) the source database and entering a safe mode in which user operations are halted, it is desirable to take only a minimum number of snapshots in a day. Thus, choices of state that may recreated from a snapshot may be limited. If a state is desired that falls between the capture of two snapshots, the user is generally out of luck. Thus, the desire to limit the number of snapshots in a day results in a significant technical problem that results in losing changes made to a database since the last snapshot capture or between two snapshot captures. Therefore, between two snapshot captures, one or more transactional logs of the source database may be captured. The protection schedule may define the frequency of capturing transactional logs. For example, the protection schedule may define that a transactional log is to be captured every hour. Thus, and continuing with the example above, every hour between 8:00 AM and 8:00 PM, a transactional log may be captured of the source database. In some embodiments, once the protection schedule is defined, the snapshots and transactional logs may be captured automatically by the Controller 205 (or another controller designated for protecting the source database) and stored within the storage pool 170 (or another designated storage device). In some embodiments, the protection schedule may be defined in accordance with the terms of a Service Level Agreement ("SLA").

At operation 515, snapshots of the source database may be taken. A snapshot stores the state of the source database at the point in time at which the snapshot is captured. The snapshot is thus a point in time image of the database. The snapshot may include a complete encapsulation of the virtual machine (e.g., the virtual disk(s) of the virtual machine) on which the database is created, including the configuration data of the virtual machine, the data stored within the database, and any metadata associated with the virtual machine. Any of a variety of snapshotting techniques may be used. For example, in some embodiments, copy-on-write, redirect-on-write, near-sync, or other snapshotting methods may be used to capture snapshots. For example, is some embodiments, the source database may be quiesced (e.g., paused) using, for example, a Virtual Shadow service (or other service). By quiescing the source database, updates to the source database may be paused. Once paused, any in-memory data may be flushed to the virtual disk(s), and an application consistent snapshot of the virtual disk(s) may be taken using one of the methods mentioned above.

In some embodiments, the virtual disk(s) associated with the virtual machine on which the source database is stored may be composed of or divided into one or more memory blocks. To capture a snapshot of the source database, images or copies of those memory blocks may be made. A copy of the memory blocks may be made by identifying the memory pointer (e.g., location) assigned to each memory block and copying the memory pointer to a repository. During a first snapshot of the memory blocks, the contents of all the memory blocks may be copied. From the snapshot, the source database may be recreated to the state at which the snapshot was captured.

At operation 520, one or more transactional logs of the source database may be captured. A transactional log may be a text, image, disk, or other type of file that records every transaction or change that occurs on the source database since a last snapshot capture or since the most recent transactional log capture. Thus, after the first snapshot is captured, transactional logs may be captured based upon the protection schedule to record all transactions or changes in the source database after the capture of the first snapshot. For example, say the protection schedule defines capturing 2 snapshots each day and 2 transactional logs between the 2 snapshot captures. If the source database includes 1000 memory blocks, the first snapshot creates copies (e.g., of pointers) of all the 1000 memory blocks.

If after capturing the first snapshot, 4 out of the 1000 memory blocks of the source database have changed (e.g., due to data being updated, new data being added, etc.), a first transactional log based upon the protection schedule may be captured. The first transactional log may reflect that the 4 blocks have changed since the first snapshot capture. Specifically, the first transactional log may include memory pointers to the 4 memory blocks that have changed. Thus, instead of copying all of the 1000 memory blocks, the first transactional log only copies the changes since the first snapshot capture, thereby saving space and time. Similarly, based upon the protection schedule, a second transactional log may be captured after the first transactional log. In some embodiments, the second transactional log may determine which memory blocks have changed since the first snapshot capture. For example, if 6 memory blocks have changed since the first snapshot capture, the second transactional log may include memory pointers back to the first snapshot indicating which 6 of the memory blocks have changed. In other embodiments, the second transactional log may determine which memory blocks have changed since the first transactional log capture and save those memory pointers instead.

When a second snapshot is captured, the transactional logs captured after the second snapshot may be relative to the second snapshot. By using a combination of snapshots and transactional logs, any state (e.g., point in time state) of the source database down to possibly the last second (or even fractions of seconds or other time granularities) may be recreated. Thus, states of the source database that fall between the capture of two snapshots may be recreated by using a combination of snapshots and transactional logs.

At the operation 520, a point in time first AG clone (e.g., the initial AG clone 435) of the source database is created using one of the snapshots and one or more transactional logs captured at the operation 515. For example, when the source database is cloned, say to a state when the second transactional log in the example above is captured, the first snapshot and the second transactional log may be used (if the second transactional log captures changes relative to the first snapshot. If the second transactional log captures changes with respect to the first transactional log, then both first and second transactional logs may be used). Specifically, from the memory pointers in the second transactional log, the particular memory blocks that have changed since the first snapshot may be determined. In the example above, the second transactional log includes memory pointers of the 6 memory blocks that have changed since the first snapshot capture. Thus, the first AG clone (e.g., the initial AG clone 435) may be created using the memory blocks from the first snapshot that have not changed plus the 6 memory blocks in the second transactional log that have changed. Thus, the first AG clone reflects an accurate state of the source database at the time of the second transactional log capture.

In some embodiments, the first AG clone (e.g., the initial AG clone 435) may be stored within the primary replica node 405 and may constitute the second copy of the source database on the primary replica node (e.g., to satisfy a replication factor of 2). In other embodiments, the first AG clone (e.g., the initial AG clone 435) may be stored on other nodes (e.g., the secondary nodes 410, 415). Additional AG clones of the source database may now be made using the first AG clone (e.g., the initial AG clone 435) for storing either on the primary replica node 405 and/or on the secondary replica nodes 410, 415.

To create the additional AG clones from the first AG clone (e.g., the initial AG clone 435), upon creating the first AG clone, at operation 525, the first AG clone may be made operational and a protection schedule may be associated therewith. By defining a protection schedule for the first AG clone (e.g., the initial AG clone 435), snapshots and transactional logs may be captured of the first AG clone. For example, snapshots and transactional logs may be captured from the virtual or storage disk(s) associated with the first AG clone (e.g., the initial AG clone 435) similar to the capturing of snapshots and transactional logs from the source database. In some embodiments, the first AG clone (e.g., the initial AG clone 435) may be created and brought online at the point in time at which the replication of the source database is desired. For example, the first AG clone (e.g., the initial AG clone 435) may be created/brought online at Time A at which the replication of the source database is desired. Thus, the first AG clone (e.g., the initial AG clone 435) may reflect the state of the source database at Time A.

At operation 530, to create the additional AG clones (e.g., the second AG clones) on the secondary replica nodes 410 and 415 to satisfy the replication factor of 2, a snapshot of the first AG clone (e.g., the initial AG clone 435) is taken to create a linked cloned disk. The linked cloned disk includes links/pointers to data that is stored within the storage disk(s) of the first AG clone (e.g., the initial AG clone 435), which in turn includes links/pointers to storage disk(s) of the source database. Thus, the linked cloned disk created from the first AG clone (e.g., the initial AG clone 435) directly or indirectly contains pointers to the storage disk(s) of the source database. At operation 535, an empty log backup of the first AG clone (e.g., the initial AG clone 435) is taken. The empty log is a transactional log with no data therein. Thus, the empty log may be considered zero sized. In some embodiments, the empty log backup may be taken at or about the same time as the snapshot of the operation 530. At operation 540, the snapshot captured at the operation 530 may be cloned (e.g., saved) onto the secondary replica nodes 410 and 415, and the clones may be put into a restoring mode using the Virtual Shadow Service (or another service).

The cloned disk of the operation 530 and the empty log captured at the operation 535 may be copied to the secondary replica nodes 410 and 415. The empty log may be applied to the linked cloned disk at the secondary replica nodes 410 and 415 to obtain the second AG clones (e.g., the additional AG clones 440 and 445). Since the linked cloned disk copied to the secondary replica nodes 410 and 415 is a linked cloned disk, which is essentially zero size (e.g., a minimal/negligible amount of space is consumed by the links/pointers), and the empty log is zero sized, each of the second AG clones (e.g., the additional AG clones 440 and 445) created from the linked cloned disk and the empty log may be considered zero sized (or substantially zero sized).

Using the process 500, the total storage space needed for all the AG clones (e.g., the first AG clone+each of the second AG clones) may be given by the following formula: ((1*size of log applied)+(N*size of empty log backup))*Replication Factor, where N is the number of nodes in the AG, "size of log applied" is the size of the transactional log applied to create the first AG clone (e.g., the initial AG clone 435), and the "size of empty log backup" is the size of the empty log captured at the operation 535 and applied to create each of the second AG clones (e.g., the additional AG clones 440, 445). The above formula does not include the space consumed by the links/pointers of each of the linked cloned disks of the first and second AG clones. However, as indicated above, the storage space consumed by these links/pointers may be considered essentially zero sized compared to the size of the actual data.

Since the linked cloned disks are essentially zero sized, and since the empty transactional logs (e.g., the empty log) are zero sized, and since size of source database >>size of non-empty transactional log applied >>size of empty log, the second AG clones (e.g., the additional AG clones 440 and 445) are essentially zero sized, thereby consuming little to no extra storage space. Further, the first AG clone (e.g., the initial AG clone 435) only consumes the storage space needed for the transactional logs. The linked cloned disk of the first AG clone (e.g., the initial AG clone 435) is essentially zero. Thus, even the first AG clone (e.g., the initial AG clone 435) offers considerable space savings compared to a conventional clone. The process 500 ends at operation 545. Thus, by using substantially zero sized cloned databases in the AG, the present disclosure provides considerable space savings while still providing all the advantages of the AG.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   creating, by a processor executing computer-readable instructions stored on a memory, a first clone from a first linked cloned disk created from a first snapshot captured from a source database; and
   creating, by the processor, a second clone from a second linked cloned disk created from a second snapshot captured from the first clone, wherein an empty transactional log captured from the first clone is applied to the second linked cloned disk to create the second clone, and wherein the source database, the first clone, and the second clone are part of an always on availability group.

2. The method of claim 1, further comprising applying, by the processor, a non-empty transactional log captured from the source database to the first linked cloned disk for creating the first clone.

3. The method of claim 1, further comprising:
   storing, by the processor, the first clone at a first location; and
   storing, by the processor, the second clone at a second location different than the first location.

4. The method of claim 3, wherein the first location and the second location each comprise a cloud location associated with the always on availability group.

5. The method of claim 3, further comprising storing, by the processor, the source database at the first location.

6. The method of claim 3, wherein each of the first location and the second location is a node of a cluster associated with the always on availability group.

7. The method of claim 3, further comprising storing, by the processor, the second clone at additional locations.

8. The method of claim 1, further comprising capturing, by the processor, the first snapshot and the second snapshot based on a service level agreement associated with the source database.

9. The method of claim 1, wherein a size of the first clone is greater than the size of the second clone.

10. The method of claim 1, further comprising:
    storing, by the processor, the first clone and one or more copies of the first clone at a first location based on a first replication factor; and
    storing, by the processor, the second clone and one or more copies of the second clone at a second location based on a second replication factor.

11. A system comprising:
    a memory having computer-readable instructions stored thereon; and
    a processor that executes the computer-readable instructions to:
       create a first clone from a first linked cloned disk created from a first snapshot captured from a source database; and create a second clone from a second linked cloned disk created from a second snapshot captured from the first clone, wherein an empty transactional log captured from the first clone is applied to the second linked cloned disk to create the second clone, and wherein the source database, the first clone, and the second clone are part of an always on availability group.

12. The system of claim 11, wherein the processor further executes computer-readable instructions to apply a non-empty transactional log captured from the source database to the first linked cloned disk for creating the first clone.

13. The system of claim 11, wherein the processor further executes computer-readable instructions to:
store the first clone at a first location; and
store the second clone at a second location different than the first location.

14. The system of claim 13, wherein the first location and the second location each comprise a cloud location associated with the always on availability group.

15. The system of claim 13, wherein the processor further executes computer-readable instructions to store the source database at the first location.

16. The system of claim 13, wherein each of the first location and the second location is a node of a cluster associated with the always on availability group.

17. The system of claim 13, wherein the processor further executes computer-readable instructions to store the second clone at additional locations.

18. The system of claim 11, wherein the processor further executes computer-readable instructions to capture the first snapshot and the second snapshot based on a service level agreement associated with the source database.

19. The system of claim 11, wherein a size of the first clone is greater than the size of the second clone.

20. The system of claim 11, wherein the processor further executes computer-readable instructions to:
store the first clone and one or more copies of the first clone at a first location based on a first replication factor; and
store the second clone and one or more copies of the second clone at a second location based on a second replication factor.

21. A non-transitory computer-readable media comprising computer-readable instructions stored thereon that when executed by a processor cause the processor to:
create a first clone from a first linked cloned disk created from a first snapshot captured from a source database; and
create a second clone from a second linked cloned disk created from a second snapshot captured from the first clone, wherein an empty transactional log captured from the first clone is applied to the second linked cloned disk to create the second clone, and wherein the source database, the first clone, and the second clone are part of an always on availability group.

22. The non-transitory computer-readable media of claim 21, wherein the processor further executes computer-readable instructions to apply a non-empty transactional log captured from the source database to the first linked cloned disk for creating the first clone.

23. The non-transitory computer-readable media of claim 21, wherein the processor further executes computer-readable instructions to:
store the first clone at a first location; and
store the second clone at a second location different than the first location.

24. The non-transitory computer-readable media of claim 23, wherein the first location and the second location each comprise a cloud location associated with the always on availability group.

25. The non-transitory computer-readable media of claim 23, wherein the processor further executes computer-readable instructions to store the source database at the first location.

26. The non-transitory computer-readable media of claim 23, wherein each of the first location and the second location is a node of a cluster associated with the always on availability group.

27. The non-transitory computer-readable media of claim 23, wherein the processor further executes computer-readable instructions to store the second clone at additional locations.

28. The non-transitory computer-readable media of claim 21, wherein the processor further executes computer-readable instructions to capture the first snapshot and the second snapshot based on a service level agreement associated with the source database.

29. The non-transitory computer-readable media of claim 21, wherein a size of the first clone is greater than the size of the second clone.

30. The non-transitory computer-readable media of claim 21, wherein the processor further executes computer-readable instructions to:
store the first clone and one or more copies of the first clone at a first location based on a first replication factor; and
store the second clone and one or more copies of the second clone at a second location based on a second replication factor.

* * * * *